US008051075B2

(12) United States Patent
Dampier

(10) Patent No.: US 8,051,075 B2
(45) Date of Patent: Nov. 1, 2011

(54) TEMPORALLY-AWARE EVALUATIVE SCORE

(75) Inventor: Todd O. Dampier, Menlo Park, CA (US)

(73) Assignee: Merced Systems, Inc., Redwood Shores, CA (US)

(*) Notice: Subject to any disclaimer, the term of this patent is extended or adjusted under 35 U.S.C. 154(b) by 882 days.

(21) Appl. No.: 11/860,275

(22) Filed: Sep. 24, 2007

(65) Prior Publication Data

US 2009/0083216 A1 Mar. 26, 2009

(51) Int. Cl.
G06F 7/00 (2006.01)
(52) U.S. Cl. .................................. 707/723; 707/725
(58) Field of Classification Search .................. 707/723, 707/725
See application file for complete search history.

(56) References Cited

U.S. PATENT DOCUMENTS

| | | | |
|---|---|---|---|
| 4,918,603 A | 4/1990 | Hughes et al. |
| 5,832,496 A | 11/1998 | Anand et al. |
| 5,864,857 A | 1/1999 | Ohata et al. |
| 6,003,024 A | 12/1999 | Bair et al. |
| 6,161,103 A | 12/2000 | Rauer et al. |
| 6,233,573 B1 | 5/2001 | Bair et al. |
| 6,371,855 B1 | 4/2002 | Gavriloff |
| 6,578,028 B2 | 6/2003 | Egilsson et al. |
| 6,581,068 B1 | 6/2003 | Bensoussan et al. |
| 6,735,593 B1 | 5/2004 | Williams |
| 6,970,874 B2 | 11/2005 | Egilsson et al. |
| 7,013,290 B2 | 3/2006 | Ananian |
| 7,177,854 B2 | 2/2007 | Chun et al. |
| 7,366,730 B2 | 4/2008 | Greenfield et al. |
| 7,415,485 B2 | 8/2008 | Brooks et al. |
| 7,653,528 B2 | 1/2010 | Kohlmeier et al. |
| 2001/0049677 A1 | 12/2001 | Talib et al. |
| 2002/0062315 A1 | 5/2002 | Weiss et al. |
| 2002/0095430 A1 | 7/2002 | Egilsson et al. |
| 2002/0099563 A1 | 7/2002 | Adendorff et al. |
| 2002/0116362 A1 | 8/2002 | Li et al. |
| 2002/0126545 A1 | 9/2002 | Warren et al. |

(Continued)

FOREIGN PATENT DOCUMENTS

CA 2418753 8/2003

(Continued)

OTHER PUBLICATIONS

Merced (Article entitled "Merced Configuration Guide", dated 2003).*

(Continued)

Primary Examiner — Shahid A Alam
Assistant Examiner — Donald Lawson
(74) Attorney, Agent, or Firm — Beyer Law Group LLP

(57) ABSTRACT

A method includes processing a performance query to a dimensional data model by processing dimension coordinates that exist within the dimensional data model, wherein the dimension coordinates have a first particular grain ("finer grain") that is finer than a second particular grain ("coarser grain"), the method to determine an evaluative score for a particular finer grain value based on performance facts for dimension coordinates associated with the particular finer grain value. Performance parameters are determined relative to a particular coarser grain value, against which to measure the performance facts associated with the finer grain value, including processing the temporal relationships of finer grain values to coarser grain values for the dimension coordinates. The evaluative score is determined for the particular finer grain value based on performance facts of dimension coordinates having the particular finer grain value, in view of the determined performance parameters.

15 Claims, 17 Drawing Sheets

U.S. PATENT DOCUMENTS

| | | |
|---|---|---|
| 2002/0198909 A1 | 12/2002 | Huynh et al. |
| 2003/0018634 A1 | 1/2003 | Shringeri et al. |
| 2003/0023608 A1 | 1/2003 | Egilsson et al. |
| 2004/0024790 A1 | 2/2004 | Everett |
| 2004/0153435 A1 | 8/2004 | Gudbjartsson et al. |
| 2004/0260671 A1 | 12/2004 | Potter et al. |
| 2005/0060332 A1 | 3/2005 | Bernstein et al. |
| 2005/0080802 A1 | 4/2005 | Cras et al. |
| 2005/0120021 A1 | 6/2005 | Tang et al. |
| 2006/0010113 A1 | 1/2006 | Berger et al. |
| 2006/0252476 A1 | 11/2006 | Bahou |
| 2007/0027843 A1 | 2/2007 | Auerbach et al. |
| 2007/0060325 A1 | 3/2007 | Gradek |
| 2007/0143262 A1 | 6/2007 | Kasperski |
| 2007/0233651 A1 | 10/2007 | Deshpande et al. |
| 2007/0243917 A1 | 10/2007 | Wojewoda et al. |
| 2008/0005078 A1 | 1/2008 | Dampier et al. |
| 2008/0097964 A1 | 4/2008 | Dampier et al. |
| 2008/0154556 A1 | 6/2008 | Dampier |
| 2008/0154856 A1 | 6/2008 | Riise et al. |

FOREIGN PATENT DOCUMENTS

| | | |
|---|---|---|
| EP | 1450274 | 8/2004 |

OTHER PUBLICATIONS

"Configuration Guide" Version 2.0, 2002-2003, Merced Systems Inc, pp. 1-126.*

Ballard et al., "Chapter 4. Data analysis techniques," Dimensional Modeling: In a Business Intelligence Environment, Mar. 2006, pp. 77-102, XP007909863, URL: http://www.redbooks.ibm.com/redbooks/pdfs/sg247138.pdf.

Ballard et al., "Chapter 5. Modeling Considerations," Dimensional Modeling: In a Business Intelligence Environment, Mar. 2006, pp. 103-226, XP007909863, URL: http://www.redbooks.ibm.com/redbooks/pdfs/sg247138.pdf.

International Search Report in corresponding PCT Application No. PCT/US2008/077263, mailed Oct. 2, 2009.

Written Opinion in corresponding PCT Application No. PCT/US2008/077263, mailed Oct. 2, 2009.

"KPI Daily Report," dated Oct. 11, 2003.

"Merced Reports," collectively dated Jun. 12, 2004.

Bauer et al, "Data-Warehouse-Systeme," Architektur Entwicklung Anwendung, 2001, pp. 183-195, Heidleberg Germany.

International Search Report from corresponding PCT Application PCT/2007/071814, mailed Nov. 26, 2007.

International Search Report in corresponding PCT application PCT/US2007/082104, mailed Jun. 11, 2008.

International Search Report in corresponding PCT application PCT/US2007/087104, mailed Jun. 5, 2008.

Kimball R., "Kimball Design Tip #35:Modeling The Spans", Kimball Group—Kimball University, [Online] Jun. 13, 2002, XP002458646, USA, Retrieved from the Internet: URL: http://www.kimballgroup.com/html/designtipsPDF/DesignTips2002/KimballDT35ModelingSpans.pdf, retrieved on Nov. 15, 2007.

Kimball, R., "The Data Warehouse Toolkit", 1996, John Wiley and Sons Inc., XP002482356, pp. 243-277.

Kimball, Ralph, "*Human Resource Data Marts: Design Guidelines for Querying and Analyzing Employee Data*", DBMS online, http://www.dbmsmag.com/9802d05.html, printed on Jun. 14, 2006.

Kimball, Ralph, "*Kimball Design Tip #8: Perfectly Partitioning History with the Type 2 Slowly Changing Dimension*", No. 8, May 21, 2000, www.kimballgroup.com.

Kimball, Ralph, "Pipelining Your Surrogates: A Good Surrogate Key System is Worth the Work", DBMS online, http://www.dbmsmag.com/9806d05.html, printed on Jun. 14, 2006.

Kimball, Ralph, "*Surrogate Keys: Keep Control Over Record identifiers by Generating New Keys for the Data Warehouse*", DBMS online, http://www.dbmsmag.com/9805d05.html, printed on Jun. 14, 2006.

Merced Systems, Inc., "Introduction to Merced Performance Suite, Software Version 2.2," 2004, 96 pages.

Riedewald et al., "Efficient Integration and Aggergation of Historian Infonrmation," Sigmod 2002. Proceedings of the ACM Sigmod International Conference on the Management of Data, Madison, WI, Jun. 4-6, 2002, pp. 13-24.

Rieger B., "Mastering Time Variances of Dimension Tables i n the Data Warehouse", Universitat Osnabruck , [Online] Apr. 14, 1999, XP002458645, Osnabruck , Germany, Retrieved from the Internet: URL: http://andromeda.oec.uni-osnabrueck.de/uwdstift/DMOS-Res.pdf, retrieved on Nov. 14, 2007.

Samtani et al., "Recent Advances and Research Problems in Data Warehousing," Advancing in Database Technologies. Workshops on Data Warehousing and Data Mining, Mobile Data Access and Collaborative Work Support and Spatio-Temporal Data Management, Nov. 19, 1998, pp. 81-92.

Written Opinion from corresponding PCT Application PCT/2007/071814, mailed Nov. 26, 2007.

Written Opinion in corresponding PCT application PCT/US2007/082104, mailed Jun. 11, 2008.

Written Opinion in corresponding PCT application PCT/US2007/087104, mailed Jun. 5, 2008.

Y! Sports, "Fantasy Baseball Plus," Yahoo, 2004.

Y! Sports, "My Team, The Tradesman," Yahoo, 2000.

* cited by examiner

| Show report description | | | | | |
|---|---|---|---|---|---|
| Metrics \| Interactions | | | | | |
| Last 4 months | Rows 284 of 284 | Rows to show: All ▽ | Previous \| Next | | |
| My People | Jan-2005 | Feb-2005 | Mar-2005 | Apr-2005 | |
| (Dimension: Person) | | | | | |
| Hide null rows | | | | | |
| Sort labels: | | | | | |
| Ascending | | | | | |
| Descending | | | | | |
| Labels as of: | | | | | |
| Now | | | | | |
| All of report | | | | | |
| Beginning of report | | | | | |
| End of report | | | | | |
| All time | | | | | |
| Beginning of time | | | | | |
| End of time | | | | | |
| Data shown: | | | | | |
| Based on dimension constraints | | | | | |
| Not based on dimension constraints | | | | | |
| Aline West | 8 | 9 | 9 | 8 | |
| Alisa Koenig | 8 | 10 | 9 | 7 | |
| Alonzo Shepard | 9 | 8 | 9 | 8 | |
| Alphonse Dove | 8 | 7 | 8 | 6 | |
| Alphonse Tilley | 0 | 0 | 0 | 0 | |
| Alva Reagan | 5 | 3 | 4 | 5 | |
|  | 11 | 9 | 11 | 9 | |
|  | 0 | 0 | 0 | 0 | |
|  | 5 | 3 | 3 | 3 | |
|  | 5 | 5 | 5 | 4 | |
|  | 0 | 0 | 0 | 0 | |
|  | 5 | 5 | 6 | 4 | |
|  | 8 | 6 | 9 | 6 | |
|  | 10 | 9 | 9 | 9 | |
|  | 2 | 4 | 2 | 4 | |
|  | 8 | 7 | 7 | 7 | |
|  | 6 | 6 | 6 | 6 | |
|  | 9 | 8 | 8 | 9 | |
|  | 5 | 7 | 6 | 5 | |
|  | 6 | 7 | 6 | 6 | |

*Fig. 17*

TEMPORALLY-AWARE EVALUATIVE SCORE

BACKGROUND

The present invention is in the field of considering the phenomena of slowly changing dimensions in the process of evaluating facts of or derived from a collection of facts organized as, or otherwise accessible according to, a dimensional data model. For shorthand throughout this description, such a collection of facts is referred to as a dimensionally-modeled fact collection.

It is known to respond to a query to a dimensionally-modeled fact collection by reporting on the facts contained in the dimensionally-modeled fact collection. Reports are typically generated to allow one to glean information from facts that are associated with locations in a dimensional data space according to which the dimensionally-modeled fact collection is modeled.

Locations in an n-dimensional data space are specified by n-tuples of coordinates, where each member of the tuple corresponds to one of the n dimensions. For example, ("San Francisco", "Sep. 30, 2002") may specify a location in a two-dimensional data space, where the dimensions are LOCATION and TIME. Coordinates need not be singled-grained entities. That is, coordinates of a single dimension may exist at, or be specified with respect to, various possible grains (levels of detail). In one example, a coordinate of a LOCATION dimension is comprised of the following grains: CONTINENT, COUNTRY, CITY.

The order of the grains may have some hierarchical significance. The grains are generally ordered such that finer grains are hierarchically "nested" inside coarser grains. Using the LOCATION dimension example, the CITY grain may be finer than the COUNTRY grain, and the COUNTRY grain may be finer than the CONTINENT grain. Where the order of the grains of a dimension has hierarchical significance, the value of a coordinate of that dimension, at a particular grain, is nominally such that the value of the coordinate of that dimension has only one value at any coarser grain for that dimension. In an example, a value of a coordinate of a LOCATION dimension may be specified at the CITY grain of the LOCATION dimension by the value "Los Angeles." This same coordinate has only one value at the COUNTRY and CONTINENT grains: "US" and "NORTH AMERICA", respectively.

There is a well-known phenomenon in the field of dimensional data modeling of "slowly changing dimensions," mentioned briefly above. This is a phenomenon in which the relationship of grains for a dimension may change over time. While it may be contrived to consider the concept of slowly changing dimensions with reference to the example LOCATION dimension (since, generally, the relationship of CONTINENT, COUNTRY and CITY grains will not change over time), there are other more realistic examples of this phenomenon.

As one illustration, consider an EMPLOYEE dimension that is intended to represent an organizational chart of a company. In this example, the EMPLOYEE dimension comprises the following grains: ORGANIZATION, DIVISION, TEAM and PERSON. Using this example, it can be seen that values of coordinates at various grains may change as a person moves from one team to another team (or, perhaps, a team moves from one division to another division). For example, in one month, Joe worked on the Red Team; the next month, he worked on the Blue Team. This may be modeled by one EMPLOYEE dimension coordinate having the value "Joe" at grain PERSON and the value "Red Team" at grain TEAM, plus a second EMPLOYEE dimension coordinate also having the value "Joe" and grain PERSON but the value "Blue Team" at grain TEAM. It is also possible to encode in the representation of the dimension coordinates the specific time intervals during which these grain relationships obtained.

SUMMARY

A method includes processing a performance query to a dimensional data model by processing dimension coordinates that exist within the dimensional data model, wherein the dimension coordinates have a first particular grain ("finer grain") that is finer than a second particular grain ("coarser grain"), the method to determine an evaluative score for a particular finer grain value based on performance facts for dimension coordinates associated with the particular finer grain value.

Performance parameters are determined relative to a particular coarser grain value, against which to measure the performance facts associated with the finer grain value, including processing the temporal relationships of finer grain values to coarser grain values for the dimension coordinates. The evaluative score is determined for the particular finer grain value based on performance facts of dimension coordinates having the particular finer grain value, in view of the determined performance parameters.

Processing the temporal relationship of finer grain values to coarser grain values for the dimension coordinates may include unfettering, disambiguation and processing a temporal mode in the query. By considering the temporal relationships of finer grain values to coarser grain values for dimension coordinates in the dimensionally-modeled fact collection, the evaluative score may be determined in a manner that provides a more accurate evaluation, in light of historical occurrences represented by the dimensionally-modeled fact collection.

BRIEF DESCRIPTION OF THE DRAWINGS

FIG. 17 illustrates an example of a report display screen, including functionality for a report configuration menu to specify, among other things, a temporal mode corresponding to the report query.

DETAILED DESCRIPTION

The inventors have realized that it is desirable to consider the phenomenon of slowly changing dimensions in the process of evaluating facts of a collection of facts organized as, or otherwise accessible according to, a dimensionally-modeled fact collection. This may be desirable as to what facts are considered to represent the performance being evaluated and/or as to what facts are considered in determining the performance parameters, against which the performance is being evaluated.

More particularly, in accordance with an aspect, an evaluation query to a dimensionally modeled fact collection is handled by processing dimension coordinates that exist within the dimensionally-modeled fact collection, wherein the dimension coordinates have a first particular grain ("finer grain") that is finer than a second particular grain ("coarser grain"). An evaluative score is determined for a particular finer grain value based on performance facts for dimension coordinates associated with the particular finer grain value. The evaluative score is determined based on performance facts for dimension coordinates having the particular finer grain value, in view of performance parameters determined relative to a particular coarser grain value.

More generally, processing an evaluative query to determine performance facts and/or performance parameters, on which determination of the evaluative score is based, includes processing the temporal relationships of finer grain values to coarser grain values for the dimension coordinates.

Figure 1:
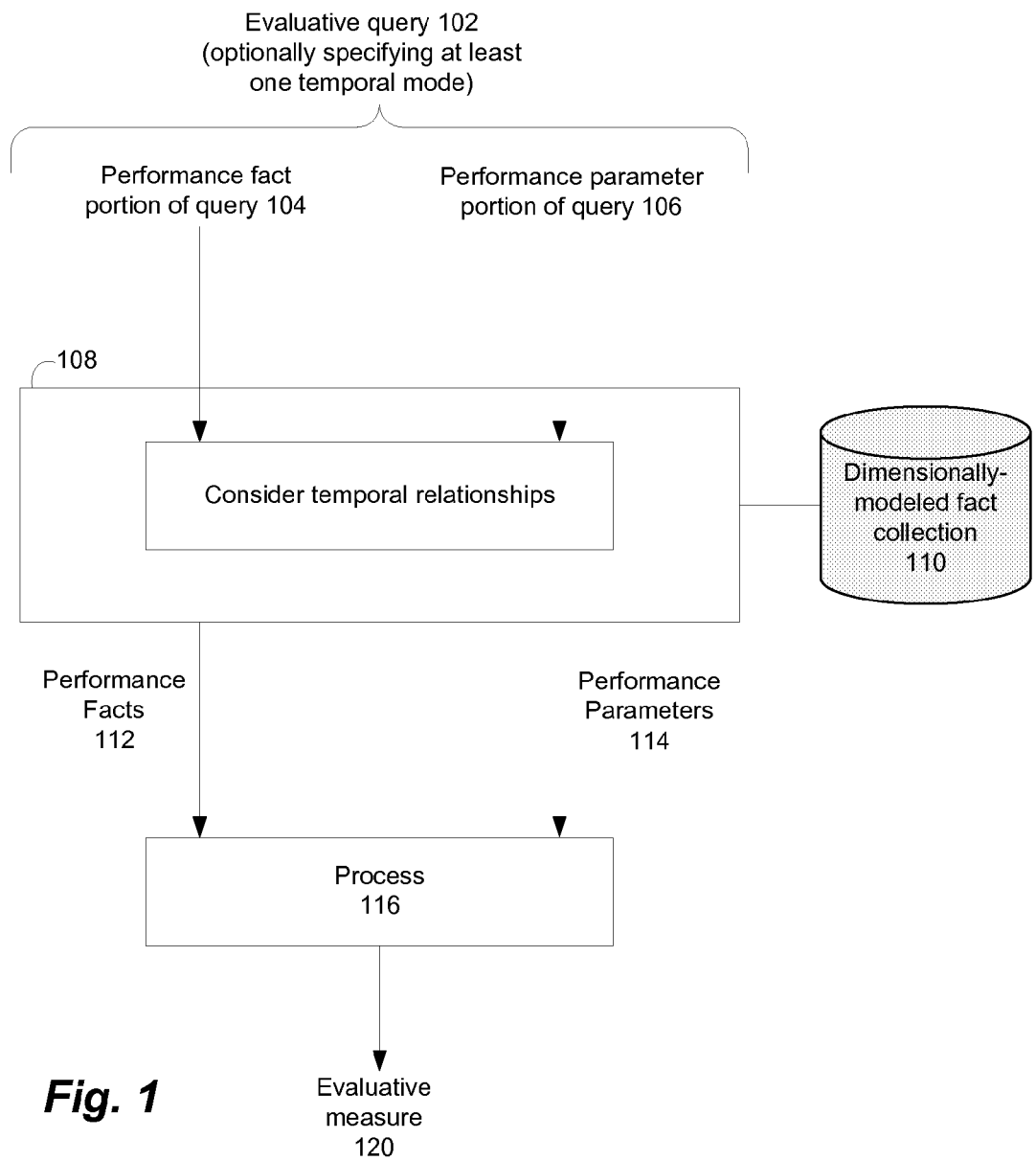
FIG. 1 is a block diagram illustrating a broad aspect of a system to determine an evaluative score based on performance facts for dimension coordinates having a particular finer grain value, in view of performance parameters determined relative to a particular coarser grain value.

FIG. 1 illustrates an example in accordance with a broad aspect. An evaluative query 102 includes two portions, a performance fact portion 104 and a performance parameter portion 106. The performance fact portion 104 and/or the performance parameter portion 106 are processed in consideration of temporal relationships of finger grain values to coarser grain values for dimension coordinates in the dimensionally-modeled fact collection 110. More detailed examples of such processing are discussed later.

The resulting performance facts 112 and performance parameters 114 are processed (116) to determine an evaluative measure 118. The processing may include, for example, processing the performance facts 112 to generate a statistic and then to compare that statistic to a determined performance parameter. It is contemplated that the processing of the performance facts 112 may include other more sophisticated comparisons and/or other processing.

By considering the temporal relationships of finer grain values to coarser grain values for dimension coordinates in the dimensionally-modeled fact collection, the evaluative score may be determined in a manner that provides a more accurate evaluation, in light of historical occurrences represented by the dimensionally-modeled fact collection.

Figure 2:
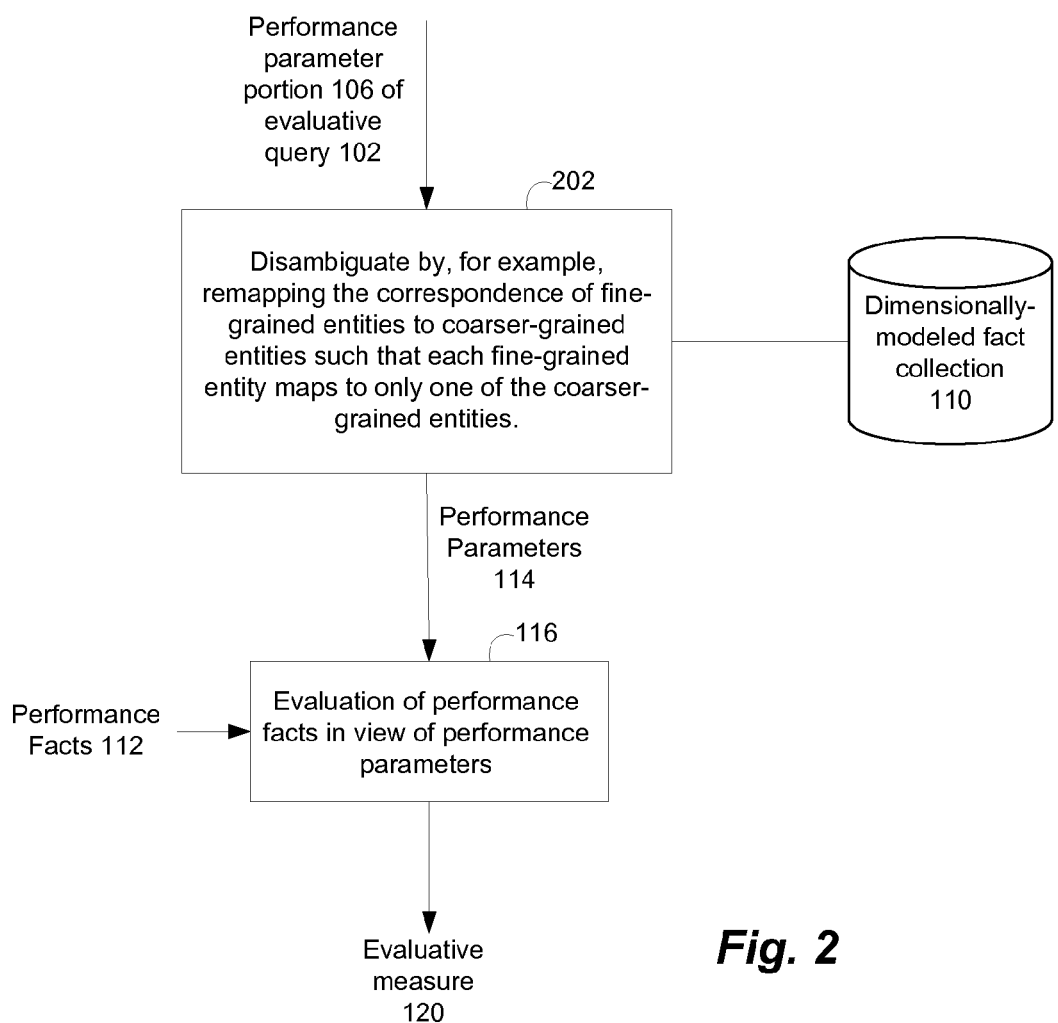
FIG. 2 illustrates an example of considering the temporal relationships of finer grain values to coarser grain values for dimension coordinates in the dimensionally-modeled fact collection includes "disambiguation."

We now turn to FIG. 2, which illustrates an example of considering the temporal relationships of finer grain values to coarser grain values for dimension coordinates in the dimensionally-modeled fact collection 110. In particular, FIG. 2 illustrates that an example of such consideration includes disambiguation similar to that described in U.S. patent application Ser. No. 11/615,694 ("the '694 application"), filed on Dec. 22, 2006 and assigned to the assignee of the present application. The '694 application is incorporated by reference herein in its entirety.

More specifically, FIG. 2 illustrates that disambiguation 202 may include, for example, remapping the correspondence of fine-grained entities to coarser-grained entities, of dimension coordinates resulting from the performance parameter portion 106 of the evaluative query 102, such that each fine-grained entity maps to only one of the coarser-grained entities. For example, the evaluative query may be to compare the cookie-eating performance of a particular person (i.e., as indicated by metric values of dimension coordinates having a value at the Person grain corresponding to that particular person) as compared to the average cookie-eating performance for the Blue Team.

The determination of average cookie-eating performance for the Blue Team may be subject to disambiguation, as is discussed in an example relative to FIG. 1 of the '694 application. The example refers to "Bill," who was a member of two different teams during a relevant time period (in the particular example, during Q4-2005). More particularly, during Q4-2005, Bill ate 60 cookies while on Red Team, and Bill also ate 60 cookies while on Blue Team. According to the discussion in the '694 application of the example, the ambiguity about Bill's team membership during Q4-2005 can be arbitrarily disambiguated. The '694 application goes on to discuss, at length, various aspects of disambiguation.

That discussion is provided in the section below, entitled "Disambiguation Disclosure." Only figure numbers (including reference numerals) and table numbers have been modified, in order to not duplicate figure numbers and table numbers used elsewhere in the application.

Figure 3:
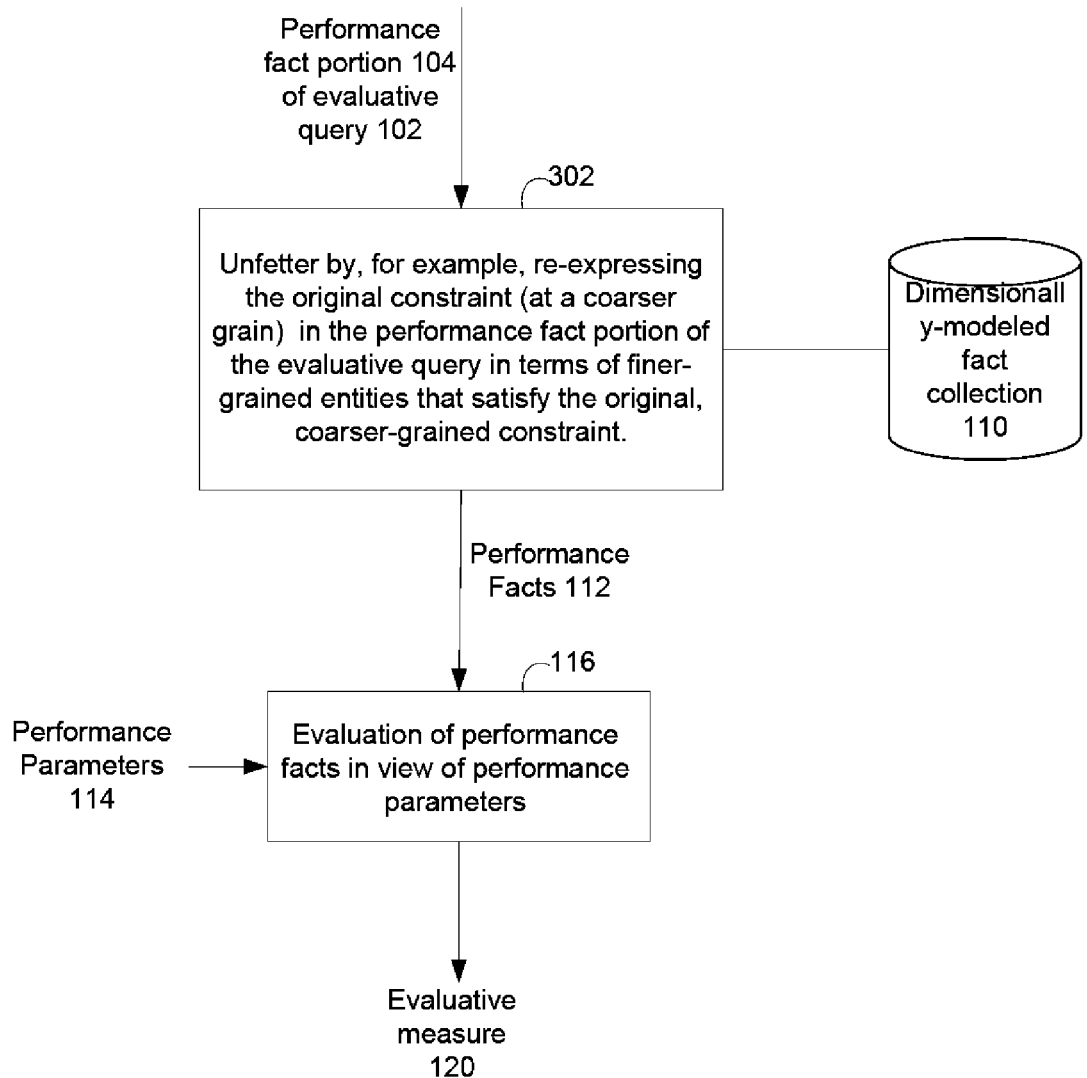
FIG. 3 illustrates an example of considering the temporal relationships of finer grain values to coarser grain values for dimension coordinates in the dimensionally-modeled fact collection includes "unfettering."

We now turn to FIG. 3, which illustrates another example of considering the temporal relationships of finer grain values to coarser grain values for dimension coordinates in the dimensionally-modeled fact collection 110. In particular, FIG. 3 illustrates that an example of such consideration includes "unfettering" similar to that described in U.S. patent application Ser. No. 11/552,394 ("the '394 application"), filed on Oct. 24, 2006 and assigned to the assignee of the present application. The '394 application is incorporated by reference herein in its entirety. More specifically, FIG. 3 illustrates that unfettering 302 may be, for example, by (at least conceptually) re-expressing the constraint in the performance fact portion 104 of the evaluative query 102 in terms of finer-grained entities of dimension coordinates satisfying an original, coarser-grained constraint.

For example, an original, coarser-grained constraint at the TEAM grain may be in terms of "Blue Team," whereas there may be a plurality of dimension coordinates having a value at a finer grain (PERSON grain) of "Bill," but only some of which also have a value of "Blue Team" at the TEAM grain. This is similar to an example in the '394 application, where a constraint expressed in terms of "Blue Team" was re-expressed in terms of "Bill" (i.e., at the finer, PERSON grain) because Bill was on the Blue Team. This resulted in including facts for Bill while Bill was on another team, such as Red Team.

The '394 application goes on to discuss, at length, various aspects of unfettering. That discussion is provided below, in the section entitled "Unfettering Disclosure." Only figure numbers (including reference numerals) and table numbers have been modified, in order to not duplicate figure numbers and table numbers used elsewhere in the application.

In addition, it is noted that the evaluative query 102 itself may include one or more temporal modes (e.g., one temporal mode corresponding to the performance fact portion 104 of the evaluative query 102 and another temporal mode corresponding to the performance parameter portion 106 of the evaluative query 102). A temporal mode may be processed in a manner similar to that described in U.S. patent application Ser. No. 11/427,718 ("the '718 application"), filed on Jun. 29, 2006 and assigned to the assignee of the present application. The '718 application is incorporated by reference herein in its entirety.

Thus, for example, each temporal mode may be processed to determine a time extent descriptor. The processing of the specified temporal mode may be in view of the dimension coordinate constraints of the evaluative query and/or a context. A fact collection query is generated, and a result of providing the fact collection query to the dimensionally-modeled fact collection is processed. The processed result includes an indication of dimensional values as appropriate in view of the time information from the time extent descriptor. More particularly, the time extent descriptor includes information about a period of time (i.e., from a "starting time" to an "ending time") to utilize in determining which values at one grain of a dimension should be considered to be also present at another grain (e.g., a coarser grain) of that dimension.

For example, the query may include the constraint of number of cookies eaten (performance facts) for "all members of Blue Team." Given the temporality of the team grain (i.e., people may move from team to team), a temporal mode (from which a time extent descriptor may be determined) may be processed (e.g., in accordance with the teachings of the '718 application) to determine which PERSON grain values to associate with the TEAM grain value of "Blue Team."

That discussion is below in the section entitled "Temporal Mode Specification Disclosure." Only figure numbers (including reference numerals) and table numbers have been modified, in order to not duplicate figure numbers and table numbers used elsewhere in the application.

Disambiguation Disclosure

The inventors have realized that it is desirable to consider the phenomenon in which, for a subset of a plurality of dimension coordinates that satisfy a report query, there are dimension coordinates of the subset that have the same grain value at a finer grain but a different grain value at a coarser grain. In this case, when performing operations with respect to dimension coordinates of this subset, there is ambiguity as to what coarser grain value to associate with the finer grain value.

This phenomenon may arise, for example, when one or more dimensions in which the dimension coordinates exist is a slowly changing dimension. This is a phenomenon in which the relationship of grains for a dimension may change over time. While it may be contrived to consider the concept of slowly changing dimensions with reference to the example LOCATION dimension (since, generally, the relationship of CONTINENT, COUNTRY and CITY grains will not change over time), there are other more realistic examples of this phenomenon.

As one illustration, consider an EMPLOYEE dimension that is intended to represent an organizational chart of a company. In this example, the EMPLOYEE dimension comprises the following grains: ORGANIZATION, DIVISION, TEAM and PERSON. Using this example, it can be seen that values of coordinates at various grains may change as a person moves from one team to another team (or, perhaps, a team moves from one division to another division). For example, at the beginning of one quarter, Bill worked on the Red Team; sometime during the quarter, Bill moved to the Blue Team. This may be modeled by one EMPLOYEE dimension coordinate having the value "Bill" at grain PERSON and the value "Red Team" at grain TEAM, plus a second EMPLOYEE dimension coordinate also having the value "Bill" at grain PERSON but the value "Blue Team" at grain TEAM. It is also possible to encode in the representation of the dimension coordinates the specific time intervals during which these grain relationships obtained.

As a simplistic example of an operation to be performed with respect to dimension coordinates satisfying a dimension coordinate constraint, it may be desired to compute the average number of cookies eaten by each team's members during Q4 2005. This computation considers multiple dimensional grains. That is, the statistical population is defined at the PERSON grain (cookies eaten by members), while the reported result is at the TEAM grain (i.e., the results are reported on a per team basis) for the time period corresponding to the Q4 2005 time reporting label (shorthand—"Q4 2005 time period").

Consider the following dimension coordinates, and metric values, characterized by a time period corresponding to the Q4 2005 time period:

TABLE 1

| Person Dimension Coordinate | Metric Value (# cookies) | Time Reporting Label |
| --- | --- | --- |
| Mary:Red Team | 100 | Q4-2005 |
| Bill:Red Team | 60 | Q4-2005 |
| Bill:Blue Team | 60 | Q4-2005 |
| Saul:Blue Team | 90 | Q4-2005 |

The cookie eating metric values could be left attached to both the PERSONs and TEAMs to which they accrued, and an average could be computed as:
(Result 1-1)
Red Team=(100+60)/2=80
Blue Team=(60+90)/2=75

This preserves an ambiguity about Bill's team membership during the Q4 2005 time period and artificially deflates the per PERSON average of both teams, since Bill is counted twice.

On the other hand, the ambiguity about Bill's team membership during the Q4 2005 time period can be arbitrarily disambiguated. For example, all of Bill's cookie eating metric values for the Q4 2005 time period could be attributed to the Red Team, even metric values for cookies eaten by Bill while Bill was on the Blue Team:
(Result 1-2)
Red Team=(100+(60+60))/2=110
Blue Team=(90)/1=90

Or, all of Bill's cookie eating metric values could be attributed to the Blue Team for the Q4 2005 time period, even metric values for cookies eaten by Bill while Bill was on the Red Team:

(Result 1-3)
Red Team=(100)/1=100
Blue Team=((60+60)+90)/2=105

In accordance with an aspect of the invention, then, and referring to the specific example of Bill and the Red Team and Blue Team, a determination is made whether those dimension coordinates corresponding to the Q4 2005 time reporting label and having a value of Bill at the PERSON grain are treated as having a value of Red Team or of Blue Team at the TEAM grain. Thus, for example, if it is determined that dimension coordinates having a value of Bill at the PERSON grain are to be treated as having a value of Red Team at the TEAM grain, then even the dimension coordinate having a value of Bill at the PERSON grain and having a value of Blue Team at the TEAM grain will be treated as having a value of Red Team at the TEAM grain.

More generally, there may be a subset of a plurality of dimension coordinates satisfying a dimension coordinate constraint of a report query, where each dimension coordinate of the subset is such that there is at least one other dimension coordinate of the subset having a finer grain value that is the same as the finer grain value of that dimension coordinate (e.g., Bill at the PERSON grain) and the at least one other dimension coordinate also has a coarser grain value that is different from the coarser grain value of that dimension coordinate (e.g., another dimension coordinate has a value of Red Team at the TEAM grain and that dimension coordinate has a value of Blue Team at the TEAM grain). In accordance with the aspect, for every unique finer grain value of the dimension coordinates of the subset (e.g., Bill is a unique grain value at the PERSON grain), the coarser grain value to associate with all dimension coordinates of the subset having that finer grain value is considered to be the coarser grain value of one of the dimension coordinates, of the subset, having that finer grain value (e.g., the coarser grain value to associate with the finer grain value of Bill is considered to be either Red Team or Blue Team).

Figure 4:
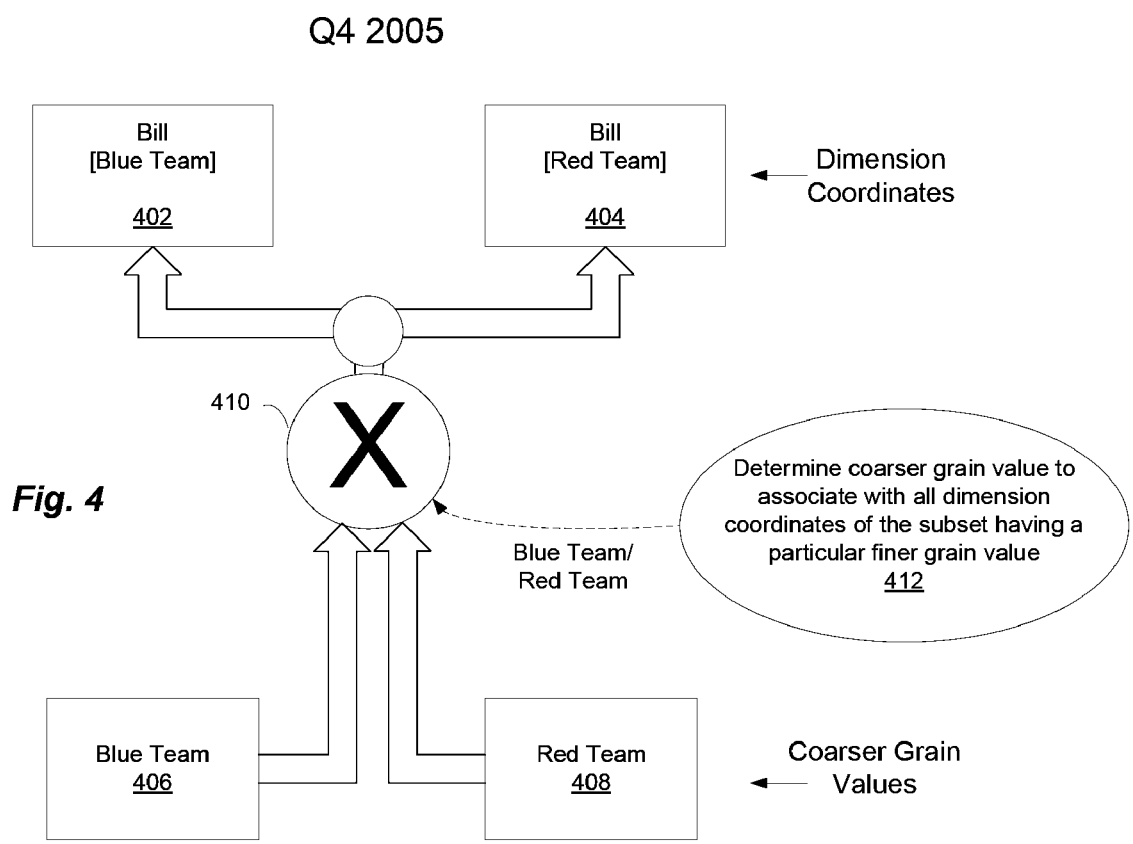
FIG. 4 graphically illustrates a simple situation in which there is only one finer grain value for which there is an ambiguity and, further, the ambiguity is between only two possible coarser grain values.

FIG. 4 illustrates this aspect graphically. With respect to FIG. 4, the PERSON grain is the finer grain and the TEAM grain is the coarser grain. The dimension coordinate 402 and the dimension coordinate 404 are considered to be dimension coordinates of a "subset." (As mentioned above, each dimension coordinate of a subset is such that there is at least one other dimension coordinate of the subset having a finer grain value that is the same as the finer grain value of that dimension coordinate and the at least one other dimension coordinate also has a coarser grain value that is different from the coarser grain value of that dimension coordinate.) More particularly, the dimension coordinate 402 and the dimension coordinate 404 each have the value Bill at the PERSON grain (finer grain), but the dimension coordinate 402 and the dimension coordinate 404 have different values at the TEAM grain. That is, the dimension coordinate 402 has the value Blue Team at the TEAM grain, and the dimension coordinate 404 has the value Red Team at the TEAM grain.

Some mechanism has been used to determine and process the time period by which the dimension coordinates 402 and 404 are characterized and, thus, to associate each of the dimension coordinates 402 and 404 (and, perhaps, one or more dimension coordinates that are not shown, for which there is no ambiguity as to what coarser grain value to associate with the finer grain values) with a particular time reporting label. In the FIG. 4 examples, the (one and only) particular time reporting label is Q4 2005.

There are various mechanisms by which dimension coordinates may be associated with time reporting labels One example is described in pending U.S. patent application Ser. No. 11/427,718, entitled "Temporal Extent Considerations in Reporting on Facts Organized as a Dimensionally-Modeled Fact Collection," filed on Jun. 29, 2006 and incorporated by reference herein in its entirety for all purposes. For example, in the U.S. patent application Ser. No. 11/427,718, the following description is provided:

In one example, the multidimensional fact collection includes metadata that provides information from which the temporal characteristics of the grain relationships can be discerned. (See, for example, the article entitled "Kimball Design Tip #8: Perfectly Partitioning History With The Type 2 Slowly Changing Dimension," available at http://www.kimballgroup.com/html/designtipsPDF/DesignTips2000%20/Kim ballDT8Perfectly.pdf, which describes augmenting dimension records with "time stamps" to temporally characterize the dimension records.)

For purposes of the present discussion, however, it should just be considered that a particular association of dimension coordinates to time reporting label(s) has been or can be somehow determined.

Referring still to FIG. 4, block 406 represents the coarser grain value of Blue Team, whereas block 408 represents the coarser grain value of Red Team. It can be seen that Blue Team and Red Team are each a possible coarser grain value to associate with the finer grain value of Bill, which is the finer grain value at the PERSON grain of both the dimension coordinate 402 and the dimension coordinate 404. In the FIG. 4 diagram, the "switch" 410 graphically represents a result of a disambiguation determination 412 as to which of the Blue Team value and the Red Team value is to be associated with the finer grain value of Bill, at the PERSON grain.

For example, if the result of the disambiguation determination 412 is that the Blue Team value is to be associated with the value Bill at the PERSON grain, then the switch 410 is figuratively positioned such that the Blue Team value 106 is associated with the value of Bill at the PERSON grain for the dimension coordinate 402 and the dimension coordinate 404, even though the dimension coordinate 404 has an actual value of Red Team at the TEAM grain. Referring to the examples above—computing the average number of cookies eaten by each team's members for the Q4 2005 time period—this would result in processing the dimension coordinates as set forth with respect to Result 1-3 above.

On the other hand, if the result of the disambiguation determination 412 is that the Red Team value is to be associated with the value Bill at the PERSON grain, then the switch 410 is figuratively positioned such that the Red Team value is associated with the value of Bill at the PERSON grain for both the dimension coordinate 402 and the dimension coordinate 404, even though the dimension coordinate 402 has an actual value of Blue Team at the TEAM grain. Again referring to the examples above—computing the average number of cookies eaten by each team's members during Q4 2005—this would result in processing the dimension coordinates as set forth with respect to Result 1-2 above.

It is noted that FIG. 4 represents a simple situation in which, for a particular subset of dimension coordinates, there is only one finer grain value for which there is an ambiguity as to an associated coarser grain value and, further, the ambiguity is between only two possible coarser grain values. By extension, there may be situations in which there is more than one finer grain value for which there is an ambiguity. In general, for example, these situations may be handled by separately disambiguating for each finer grain value for which there is an ambiguity. Furthermore, an ambiguity may be between more than two possible coarser grain values. Where an ambiguity is between more than two possible coarser grain values, the disambiguation results in a single one of the possible coarser grain values being associated with a particular finer grain value.

As mentioned several time above, we may collectively denote the dimension coordinates having finer grain values for which there is an ambiguity as a "subset" of dimension coordinates. Furthermore, FIG. 4, along with Table 1 and Results 1-2 and 1-3, illustrates an example where not only the dimension coordinates of the subset, but also the dimension coordinates of the larger group to which the subset belongs, have all been determined to be associated with a single particular time period. In particular, the example is one in which each of the dimension coordinates considered for disambiguation corresponds to the time period of the single Q4 2005 time reporting label.

Figure 5:
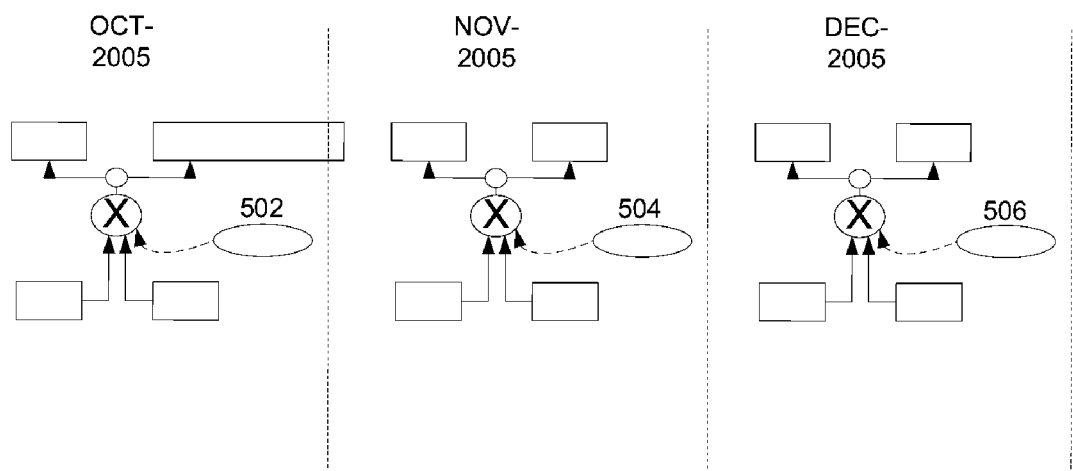
FIG. 5 graphically illustrates an example in which, similar to the FIG. 1 example, disambiguation separately occurs with respect to disambiguation time chambers for each time reporting label of the time reporting range of the report query.

Turning now to FIG. 5, unlike the FIG. 4 example, FIG. 5 exhibits an example for which there is more than a single time reporting label. That is, with respect to FIG. 5, a report is on the average number of cookies eaten by each team's members during Q4 2005, the time reporting range, reported on a monthly basis. The number of time reporting labels is three—OCT-2005, NOV-2005 and DEC-2005.

According to this example, each time reporting label corresponds to a separate non-overlapping time period, namely, the time periods associated with the OCT-2005, NOV-2005 and DEC-2005 time periods. In addition, each dimension coordinate satisfying the dimension coordinate constraint of a report query is associated with one of the separate non-overlapping time periods which we call "disambiguation time chambers." Each disambiguation time chamber corresponds to a different non-overlapping time period of the time reporting range, and the subsets for which there is disambiguation exist on a disambiguation time chamber by disambiguation time chamber basis, based on a correspondence between a time period with which a dimension coordinate is associated and a time period associated with a disambiguation time chamber.

FIG. 5 illustrates a simple example, in which the disambiguation time chambers are at the same resolution as the time reporting labels and, thus, the disambiguation time chambers coincide with the time reporting labels. Since the disambiguation time chambers coincide with time reporting labels in the FIG. 5 example, not only do the subsets exist on a disambiguation time chamber by disambiguation time chamber basis, it also follows that the subsets exist on a time reporting label by time reporting label basis. In the FIG. 5 example, there may be a subset for which there is disambiguation for each of the OCT-2005, NOV-2005 and DEC-2005 time periods. By contrast, we explain later with respect to the FIG. 6 example how the disambiguation time chambers may be at a coarser resolution than the time reporting labels and, thus, each disambiguation time chamber may simultaneously correspond to two or more time reporting labels. (We also note that a particular dimension coordinate may be associated with more than one of the time periods with which time reporting labels are associated. We will note an example of this with reference to Table 2, later in this description.)

Perhaps an easier way to consider this concept is that a time period to which each separate set of dimension coordinates corresponds is defined by a time period to which one or more of the time reporting labels corresponds. For shorthand, we refer to the time period to which one of the separate sets of dimension coordinates corresponds as a "disambiguation time chamber." In the FIG. 4 example, there is one disambiguation time chamber, and it corresponds to the Q4 2005 time period. In the FIG. 5 example, there are three disambiguation time chambers, and the three disambiguation time chambers correspond to the OCT-2005, NOV-2005 and DEC-2005 time periods, respectively. Later, we will see that not only may a disambiguation time chamber be defined by the time period to which one of the time reporting labels corresponds but, also, a disambiguation time chamber may be defined by the time period to which more than one of the time reporting labels collectively correspond (or, put another way, a disambiguation time chamber may correspond to one or more time reporting labels).

Before leaving FIG. 5, we again mention that, as discussed above relative to FIG. 4, for each subset of dimension coordinates considered for disambiguation, there may be one or more finer grain values for which there is an ambiguity as to what is the associated coarser grain value. For example, may be there is only an ambiguity as to the coarser grain value associated with "Bill" or may be there is an ambiguity as to the coarser grain value associated with "Bill" and there is also an ambiguity as to the coarser grain value associated with "Steve." Furthermore, for a particular one of those finer grain values, the disambiguation may be among two or more coarser grain values (e.g., the disambiguation may be among Red Team and Blue team, or the disambiguation may be Red Team, Blue Team and Green Team).

We now discuss an example in which a situation like the FIG. 5 situation may apply. That is, we discuss an example in which there are multiple disambiguation time chambers, the disambiguation time chambers being at the same resolution as the time reporting labels such that each disambiguation time chamber corresponds to one separate time reporting label. Consider the following dimension coordinates, metric values and time reporting labels:

TABLE 2

| Person Dimension Coordinate | Metric Value (# cookies) | Time Reporting Label |
| --- | --- | --- |
| Mary:Red Team | 25 | October 2005 |
| Mary:Red Team | 35 | November 2005 |
| Mary:Red Team | 40 | December 2005 |
| Bill:Red Team | 40 | October 2005 |
| Bill:Red Team | 20 | November 2005 |
| Bill:Blue Team | 20 | November 2005 |
| Bill:Blue Team | 40 | December 2005 |
| Saul:Blue Team | 30 | October 2005 |
| Saul:Blue Team | 30 | November 2005 |
| Saul:Blue Team | 30 | December 2005 |

(Above, it was mentioned that an example would be discussed, with reference to Table 2, of a particular dimension coordinate being associated with more than one of the time periods to which time reporting labels correspond. In Table 2, an example of such a dimension coordinate includes the dimension coordinate having the value Mary at the PERSON grain and having the value Red Team at the TEAM grain. This dimension coordinate is associated with all of the following time reporting labels: OCT 2005, NOV 2005 and DEC 2005.)

With respect to the Table 2 dimension coordinates, metric values and time reporting labels, the cookie eating metric values could be left "attached" to both the PERSONs and TEAMs to which it accrued (i.e., no disambiguation), and an average per team, per each time reporting label, could be computed as:

(Result 2-1)

| Month | Red Team | Blue Team |
| --- | --- | --- |
| October 2005 | (25 + 40)/2 = 32.5 | (30)/1 = 30 |
| November 2005 | (35 + 20)/2 = 27.5 | (20 + 30)/2 = 25 |
| December 2005 | (40)/1 = 40 | (40 + 30)/2 = 35 |

As with Result 1-1 above, it is noted how the per-PERSON average is artificially depressed for both TEAMs for the time reporting label NOV-2005, corresponding to the month Bill changed teams.

Alternatively, for a disambiguation time chamber defined by the time period to which the NOV-2005 time reporting label corresponds, the TEAM value of Red Team could be attributed to Bill for the NOV-2005 time reporting label. (It is noted that, with respect to the dimension coordinates in Table 2, dimension coordinates associated with the NOV-2005 disambiguation time chamber are the only dimension coordinates for which an ambiguity exists as to coarser grain values associated with particular finer grain values.)

(Result 2-2)

| Month | Red Team | Blue Team |
| --- | --- | --- |
| October 2005 | (25 + 40)/2 = 32.5 | (30)/1 = 30 |
| November 2005 | (35 + (20 + 20))/2 = 37.5 | (30)/1 = 30 |
| December 2005 | (40)/1 = 40 | (40 + 30)/2 = 35 |

While the Table 2 dimension coordinates are such that disambiguation is not appropriate for dimension coordinates other than a subset of dimension coordinates characterized by a time to which the NOV-2005 time reporting label corresponds (i.e., associated with the disambiguation time chamber defined by the NOV-2005 time period), for other dimension coordinates, it may be appropriate for there to be disambiguation for dimension coordinates of a subset of dimension coordinates associated with the disambiguation time chamber defined by the OCT-2005 time period and/or for the dimension coordinates of a subset of dimension coordinates associated with the disambiguation time chamber defined by the DEC-2005 time period (invoking determination 202 and/or determination 206).

As another alternative with respect to the Table 2 data, the disambiguation for the dimension coordinates associated with the disambiguation time chamber defined by the NOV-2005 time period could result in the TEAM value of Blue Team being attributed to Bill for the NOV-2005 time reporting label.

(Result 2-3)

| Month | Red Team | Blue Team |
| --- | --- | --- |
| October 2005 | (25 + 40)/2 = 32.5 | (30)/1 = 30 |
| November 2005 | (35)/1 = 35 | (30 + (20 + 20))/2 = 35 |
| December 2005 | (40)/1 = 40 | (40 + 30)/2 = 35 |

It can thus be seen that, in general, a disambiguation may occur separately for any or all disambiguation time chambers (which correspond to time reporting labels by being defined by time periods to which the time reporting labels correspond) for which there is reporting based on the report query.

Furthermore, unlike the FIG. 4 and FIG. 5 example, in which the disambiguation time chambers each correspond to a separate single respective time reporting label, there may be examples in which the disambiguation time chambers each correspond to more than one time reporting label. For example, the reporting labels may be at a month resolution (e.g., JAN-2005, FEB-2005, . . . , NOV-2005 and DEC-2005) of the time dimension. The disambiguation time chambers, may on the other hand, be at a quarter resolution (e.g., Q1 2005, Q2 2005, Q3 2005 and Q4 2005). In other words, all the dimension coordinates characterized by a time period that corresponds to any time reporting label for a month in a particular quarter would be associated with that particular quarter for disambiguation purposes.

Figure 6:
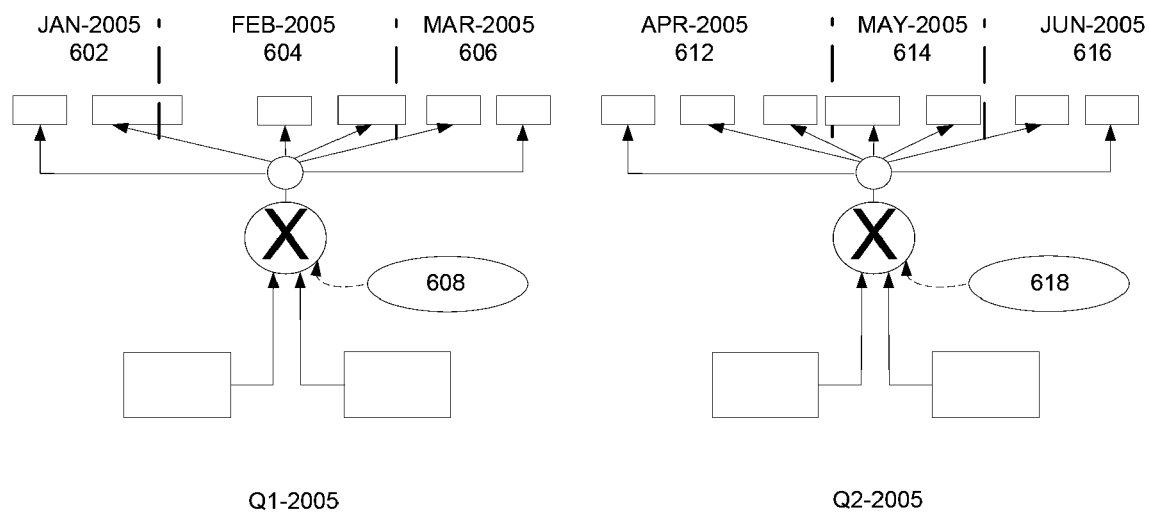
FIG. 6 graphically illustrates an example in which a disambiguation occurs for a disambiguation time chamber that spans more than one time reporting label.

FIG. 6 illustrates such an example. Referring to FIG. 6, dimension coordinates are shown that are associated with time periods corresponding to the time reporting labels JAN-2005 (302), FEB-2005 (304), MAR-2005 (306), APR-2005 (312), MAY-2005 (314) and JUN-2005 (316). Dimension coordinates associated with time periods corresponding to the remaining time reporting labels for 2005 are not shown, to simplify the illustration.

Using the example of the month resolution and quarter resolution of the 2005 time period, the disambiguation time chambers would be defined by each quarter-year time period of the whole year, for a total of four disambiguation time chambers. Again, there are four disambiguation time chambers for the 2005 time period, even though there are twelve time reporting labels for the 2005 time period. That is, the disambiguation decision for each PERSON grain entity could thus be made up to four times, once for each quarter (e.g., determinations 308 and 318 for the first and second quarter, respectively), even though the report processing is carried out twelve times, once for each "month" time reporting label.

In the discussion thus far, we have not described what criterion may be used to make particular disambiguation determinations (such as, for example, the determination 412 in FIG. 4; the determinations 502, 504 and 506 in FIG. 5; and the determinations 608 and 618 in FIG. 6).

In one example, relative to a disambiguation time chamber that corresponds to November 2005, it is supposed that Alice worked for Red Team from before November 2005 and up until 6-NOV-2005. Alice worked for Green Team from 7-NOV-2005 to 21-NOV-2005. Finally, Alice worked for Blue Team from 22-NOV-2005 until well after November 2005. Furthermore, Alice eats one cookie every day she works, and she works every day in November.

Further, suppose each team was allotted a bonus budget. Red Team's bonus budget is $3K, Green Team's bonus budget is $5k and Blue Team's bonus budget is $7k. Disambiguating Alice's team for the November 2005 disambiguation time chamber, various criteria may be considered, with varying results as to the coarser grain value (value at TEAM grain) to associate with the finer grain value of Alice (value at PERSON grain).

For example, if criterion equals "latest team," then the result is Blue Team. If the criterion equals "earliest team," then the result equals Red Team. It is noted that the "latest team" and "earliest team" criteria are time based. Other criteria may include, for example, "longest team membership during time of disambiguation time chamber." For this criterion, the results equals "Green Team." For the criterion of "highest bonus budget," the result equals Blue Team. For the criterion of "team on which she ate the most cookies," the result equals "Green Team."

It can be seen, then, that many different criteria may be used.

We now discuss some particulars of the processing that may be done in view of the association of coarser grain values with finer grainer values, where such an association may be a result of a disambiguation. In particular, processing for generating the report may include associating metric values in a "copying down" or "rolling up" direction. "Rolling up" includes associating, with a coarser grain value, a metric value that corresponds to a finer grain value (i.e., rolling up from finer to coarser) with which that coarser grain value is associated. Determining, for each month, the average number of cookies per person (metric value that corresponds to a finer grain value—at PERSON grain) eaten by each of Red Team and Blue Team (coarser grain value—at TEAM grain) is an example of rolling up. In other words, "rolling up" includes associating in a many (finer grain values) to one (coarser grain value) manner.

"Copying down" includes associating, with finer grain values, a metric value that corresponds to a coarser grain value (i.e., copying down from coarser to finer). An example of copying down includes, for each month, associating the team goal (coarser grain value—at TEAM grain) for every person (finer grain value—at PERSON grain). In other words, "copying down" includes associating in a one (coarser grain value) to many (finer grain value) manner.

In either case (copying down or rolling up), the disambiguation is useful for resolving what coarser grain value is to be associated with finer grain values, for which the association may otherwise be ambiguous.

Figure 7:
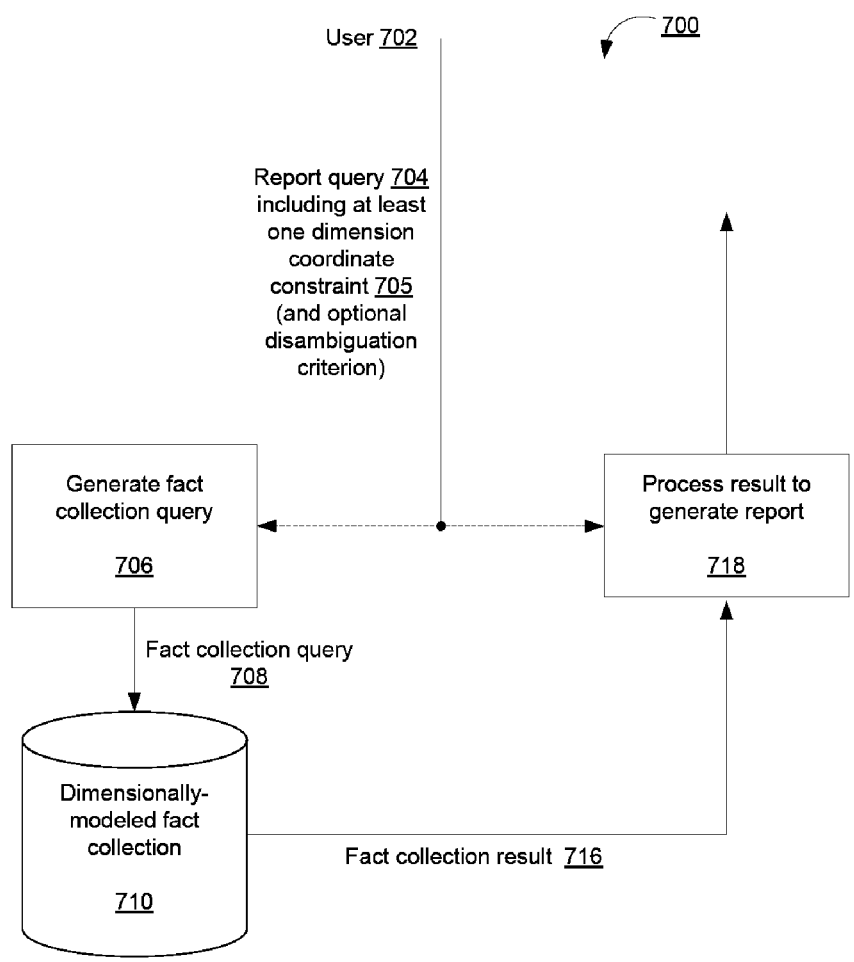
FIG. 7 is a block diagram illustrating an example architecture of a system in which reporting of facts of a dimensionally-modeled fact collection may be performed, including disambiguating as desired or as otherwise determined to be appropriate.

FIG. 7 is a block diagram illustrating an example architecture of a system 700 in which reporting of facts of a dimensionally-modeled fact collection may be performed, including disambiguating as desired or as otherwise determined to be appropriate. Referring to FIG. 7, a user 702 may cause a report query 704 to be provided to a fact collection query generator 706. For example, the user 702 may interact with a web page via a web browser, where the web page is served by a report user interface using, for example, a Java Server Page mechanism. In this example, the user 702 interacts with the web page such that the report query 704 is provided to the fact collection query generator 706. The report query 404 includes a dimension coordinate constraint, which may be one or more dimension coordinate constraints.

In general, a dimension coordinate constraint for a dimension of the dimensionally-modeled fact collection specifies coordinates of that dimension of the dimensionally-modeled fact collection. For example, a dimension coordinate constraint may specify coordinates of that dimension of the dimensionally-modeled fact collection by specifying a value of the dimension at a particular grain. Dimension coordinate constraints of the report query 704, then, specify a plurality of coordinates of one or more dimensions of the dimensionally-modeled fact collection, on which a report is to be based. It is noted that the lack of an explicit constraint may imply a "null constraint" (which, in and of itself, may be considered a dimension coordinate constraint) for which the resulting plurality of dimension coordinates on which the report is to be based, is all dimension coordinates from that dimension.

The fact collection query generator 706 processes the report query 704 to generate an appropriate corresponding fact collection query 708, which is presented to the dimensionally-modeled fact collection 710. A result 716 of presenting the fact collection query 708 to the dimensionally-modeled fact collection 710 is processed by a report generator 7418 to generate a report corresponding to the report query 704 caused to be provided by the user 702. In particular, the generated report includes an indication of processing with respect to dimensional members as appropriate in view of the dimension coordinate constraints of the report query 704.

In one example, the dimensionally-modeled fact collection 710 is implemented as a relational database, storing fact data in a manner that is accessible to users according to a ROLAP—Relational Online Analytical Processing—schema (fact and dimension tables). In this case, the fact collection query 708 may originate as a database query, in some form that is processed into another form, for example, which is processed by an OLAP query engine into a fact collection query 708, presented as an SQL query that is understandable by the underlying relational database. This is just one example, however, and there are many other ways of representing and accessing a dimensionally-modeled fact collection.

Processing 718 is applied to the fact collection result 716 to generate a report. The generated report includes an indication of dimension members and facts corresponding to those indicated dimension members. What facts are reported may depend, at least in part, on disambiguation of what coarser grain value is determined to correspond to particular finer grain values.

Referring still to FIG. 7, the composition of the generated report may be accomplished by the fact collection query generator 706 particularly generating the fact collection query 708 in accordance with the report query, by the result processing 718 particularly processing the fact collection result (e.g., by applying filtering) in accordance with the report query, or by a combination of both.

As also illustrated in FIG. 7, the report query 704 may include a disambiguation criterion that may be provided, for example, via a user interface. In some examples, in the absence of such a disambiguation criterion, the manner in which the facts corresponding to those indicated dimension members are reported may be according to a default mode or according to a preconfigured mode. The fact collection query generator 706 and/or the result processing 718, as appropriate, operate according to the default, preconfigured or designated mode.

Figure 8:
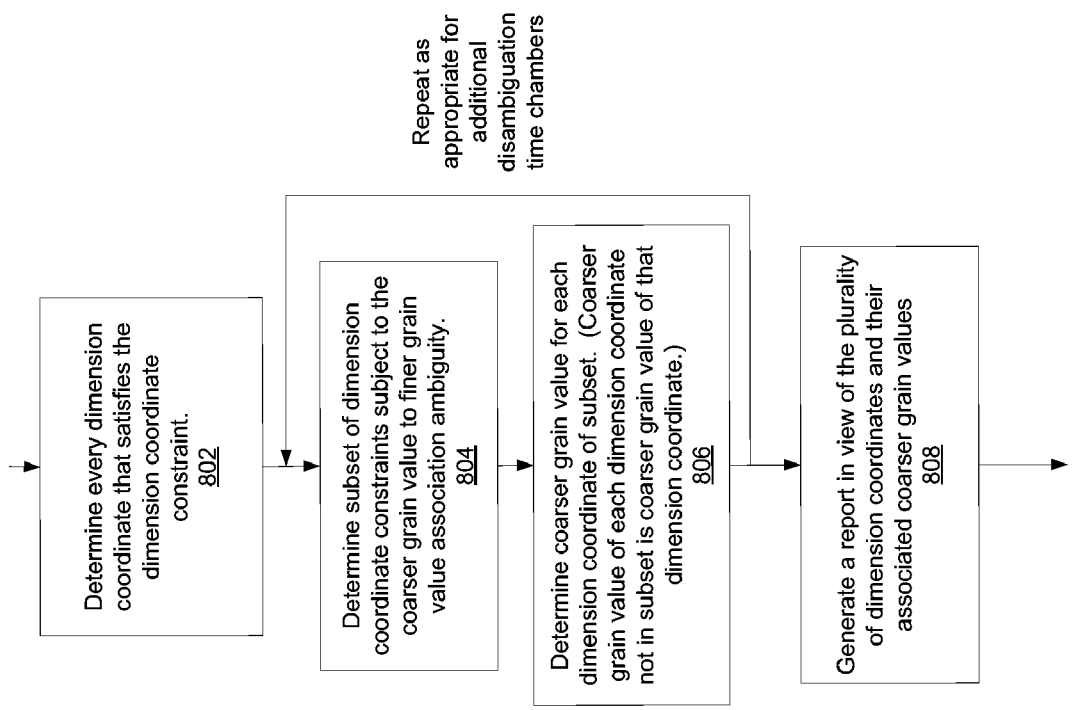
FIG. 8 is a flowchart illustrating an example of multiple-pass processing including disambiguation.

In accordance with one example, a multiple-pass processing is utilized. An example of the multiple-pass processing is illustrated by the flowchart of FIG. 8. In a first pass 802, every dimension coordinate (which may be one or more dimension coordinates) that satisfies the dimension coordinate constraint is determined. The determined dimension coordinates have a particular value at a particular grain. In another pass 804, it is determined which of the dimension coordinates are part of a subset of "ambiguous" dimension coordinates, meeting the following conditions:

Each of the dimension coordinates of the subset is such that there is at least one other dimension coordinate of the subset having a value at the finer grain ("finer grain value") that is the same as the finer grain value of that dimension coordinate; and the at least one other dimension coordinate also has a value at the coarser grain ("coarser grain value") that is different from the coarser grain value of that dimension coordinate.

That is, it is determined which of the dimension coordinates satisfying the dimension coordinate constraint of the report query are subject to the coarser grain value to finer grain value association ambiguity.

At step 806, for every unique finer grain value of the dimension coordinates of the subset, it is determined what coarser grain value to associate with all dimension coordinates of the subset having that finer grain value. In particular, the determined coarser grain value is the coarser grain value of one of the dimension coordinates, of the subset, having that finer grain value. For each of the dimension coordinates of the plurality of dimension coordinates not in the subset, the coarser grain value associated with that dimension coordinate is the coarser grain value of that dimension coordinate. Steps 804 and 806 may be repeated for additional disambiguation time chambers. That is, the subset would be determined for each additional disambiguation time chamber and disambiguation carried out as appropriate on that subset. Finally, at step 808, a report is generated in view of the plurality of dimension coordinates and their associated coarser grain values.

We have thus described how a situation may be addressed in which a subset of a plurality of dimension coordinates satisfying a dimension coordinate constraint of a report query are such that, for each dimension coordinate of the subset, there is at least one other dimension coordinate of the subset having a finer grain value that is the same as the finer grain value of that dimension coordinate and the at least one other dimension coordinate also has a coarser grain value that is different from the coarser grain value of that dimension coordinate. In particular, disambiguation may be carried out such that, for every unique finer grain value of the dimension coordinates of the subset, the coarser grain value to associate with all dimension coordinates of the subset having that finer grain value is determined, wherein the determined coarser grain value is the coarser grain value of one of the dimension coordinates, of the subset, having that finer grain value. A report may be generated in view of the plurality of dimension coordinates and their associated coarser grain values.

Unfettering Disclosure

The inventors have realized that it is desirable to consider the phenomenon in which, for each of at least one of the dimension coordinates that satisfy a dimension coordinate constraint of a report query, that dimension coordinate has a particular value at a grain associated with the report query and there are other dimension coordinates that have that particular value at the associated grain and that do not satisfy the dimension coordinate constraint. This phenomenon arises when one or more dimensions in which the dimension coordinates exist is a slowly changing dimension. In addition, there are other scenarios in which, for each of one or more of the dimension coordinates satisfying the report query, that dimension coordinate has a particular value at a grain associated with the report query and there are other dimension coordinates that have that particular value at the associated grain and that do not satisfy the dimension coordinate constraint.

We first discuss the well-known phenomenon in the field of dimensional data modeling of "slowly changing dimensions." This is a phenomenon in which the relationship of grains for a dimension may change over time. While it may be contrived to consider the concept of slowly changing dimensions with reference to the example LOCATION dimension (since, generally, the relationship of CONTINENT, COUNTRY and CITY grains will not change over time), there are other more realistic examples of this phenomenon.

As one illustration, consider an EMPLOYEE dimension that is intended to represent an organizational chart of a company. In this example, the EMPLOYEE dimension comprises the following grains: ORGANIZATION, DIVISION, TEAM and PERSON. Using this example, it can be seen that values of coordinates at various grains may change as a person moves from one team to another team (or, perhaps, a team moves from one division to another division). For example, in one month, Joe worked on the Red Team; the next month, he worked on the Blue Team. This may be modeled by one EMPLOYEE dimension coordinate having the value "Joe" at grain PERSON and the value "Red Team" at grain TEAM, plus a second EMPLOYEE dimension coordinate also having the value "Joe" and grain PERSON but the value "Blue Team" at grain TEAM. It is also possible to encode in the representation of the dimension coordinates the specific time intervals during which these grain relationships obtained.

As more background to the issue of temporal dimensions (slowly changing dimensions), we use an example relative to the EMPLOYEE dimension, mentioned above, intended to represent an organizational chart of a company. The EMPLOYEE dimension comprises the grains of ORGANIZATION, DIVISION, TEAM and PERSON. In this example, various people have moved onto and off of the Red Team. This phenomenon is modeled by EMPLOYEE dimension coordinates having value "Red Team" at grain TEAM, and having values indicative of those people at grain PERSON; these dimension members and that grain relationship are further qualified by the times during which that relationship obtained. These dimension members may be represented as follows:

TABLE 3

| value at PERSON grain | value at TEAM grain | date range for which this value at PERSON grain has the value of "Red Team" at the TEAM grain |
| --- | --- | --- |
| Joe | Red Team | 4 Jan. 2004 to 1 Mar. 2006 |
| Mary | Red Team | 3 Mar. 2003 to 18 Jul. 2006 |
| Bill | Red Team | 1 Dec. 2005 to 12 Dec. 2005 |

Continuing with the example, and noticing that Bill is only on the Red Team for part of December 2005, consider that Bill was on the Blue Team from 13 Dec. 2005 to 31 Dec. 2005. Finally, also consider that the number of calls taken during December 2005 by Joe, Mary and Bill (and Zoe as well) is represented as follows:

TABLE 4

| value at PERSON grain | value at TEAM grain | date range (during December) for "number of calls" value | number of calls taken |
| --- | --- | --- | --- |
| Joe | Red Team | 1 Dec. 2005 to 31 Dec. 2005 | 10 |
| Mary | Red Team | 1 Dec. 2005 to 31 Dec. 2005 | 22 |
| Bill | Red Team | 1 Dec. 2005 to 12 Dec. 2005 | 8 |
| Bill | Blue Team | 13 Dec. 2005 to 31 Dec. 2005 | 6 |
| Zoe | Blue Team | 1 Dec. 2005 to 31 Dec. 2005 | 12 |

Given the preceding information, a report query may request the number of calls taken during December 2005 by persons who were on the Red Team sometime during December 2005. There are some analytic scenarios in which a user may desire to know the number of calls taken by each person on the Red Team (including Bill) during December 2005 to include only those calls taken while that person was actually on the Red Team (a dimension coordinate constraint). These may be thought of as reporting on facts in a "fettered" manner, since the facts accounted for in the reported results not only correspond to the dimension coordinate constraint of persons on the Red Team but, in addition, are bound by the dimension coordinate constraint of persons on the Red Team (i.e., include facts for persons on the Red Team only while those persons are actually on the Red Team). Thus, for example, the record indicating the six calls taken by Bill while Bill was on the Blue team is not utilized for the report.

This is what would be reported conventionally. For example, using the preceding information regarding calls taken, such a report (i.e., with Bill being attributed only those calls taken during December 2005 by Bill while Bill is actually on the Red Team) may be as follows:

TABLE 5

| value at PERSON grain | December 2005 |
|---|---|
| Joe | 10 |
| Mary | 22 |
| Bill | 8 |

For example, using the preceding information regarding calls taken by Joe, Mary and Bill, it may be useful for a user to know the number of calls taken by each person on the Red Team during December 2005, without regard for whether that person was actually on the Red Team when the calls were taken. That is, it may be useful for the facts accounted for in the reported results, while corresponding in some sense to the dimension coordinate constraint of persons on the Red Team, to be not bound by the dimension coordinate constraint of persons on the Red Team (i.e., may include facts for persons on the Red Team even while those persons were not actually on the Red Team). Thus, for example, the record indicating the six calls taken by Bill while Bill was on the Blue team is utilized for this unfettered report.

Reporting on the facts in such an unfettered manner, Bill is attributed calls taken during December 2005 without regard for the team of which Bill is a member when a particular call is taken, and the report would be as follows:

TABLE 6

| value at PERSON grain | December 2005 |
|---|---|
| Joe | 10 |
| Mary | 22 |
| Bill | 14 |

Thus far, we have discussed scenarios arising due to the phenomenon of slowly changing dimensions. As mentioned above, the inventors have realized that there are other analytic scenarios in which it would be useful for the facts to be reported in an "unfettered manner" (i.e., in a manner that corresponds to, but is not strictly bound by the dimension coordinate constraint of the report query). In general, such analytic scenarios arise in situations where a grain value of dimension coordinates satisfying the dimension coordinate constraint of a report query may also be the value, at that grain, for other dimension coordinates that do not satisfy the dimension coordinate constraint of the report query.

For example, referring to Table 7 below, a dimension coordinate constraint of a report query may be with respect to weeks in the month of January (ignoring the beginning of January for simplicity of explanation).

TABLE 7

| January | week 3 | 10 |
| January | week 4 | 22 |
| January | week 5 | 8 |
| February | week 5 | 6 |
| February | week 6 | 3 |

Thus, with reference to Table 7, a report query for calls taken during a week in January (the dimension coordinate constraint being, in informal terms, "a week in January") would result in the dimension coordinates characterized by:
 a. "January" at the month grain and "week 3" at the week grain;
 b. "January" at the month grain and "week 4" at the week grain; and
 c. "January" at the month grain and "week 5" at the week grain.

However, the value of "week 5" at the week grain is also the value, at the week grain, of the dimension coordinate characterized by:
 d. "February" at the month grain and "week 5" at the week grain.

Therefore, when reporting in a fettered manner, the reported "number of calls" in response to the report query of "calls taken during a week in January" would result in a report of 10+22+8=40 calls. On the other hand, when reporting in an unfettered manner, the reported "number of calls" in response to the same report query would result in a report of 10+22+8+6=46 calls. That is, when reporting in a fettered manner, the six calls occurring during week 5 in February would not be reported, since the portion of week 5 that is in February is not in January. On the other hand, when reporting in an unfettered manner, the six calls occurring during week 5 in February would be reported. That is, these calls are still for a dimension coordinate with "week 5" at the week grain, even though the dimension coordinate does not satisfy the report query, since the dimension coordinate has the value "February" at the month grain.

Figure 9:
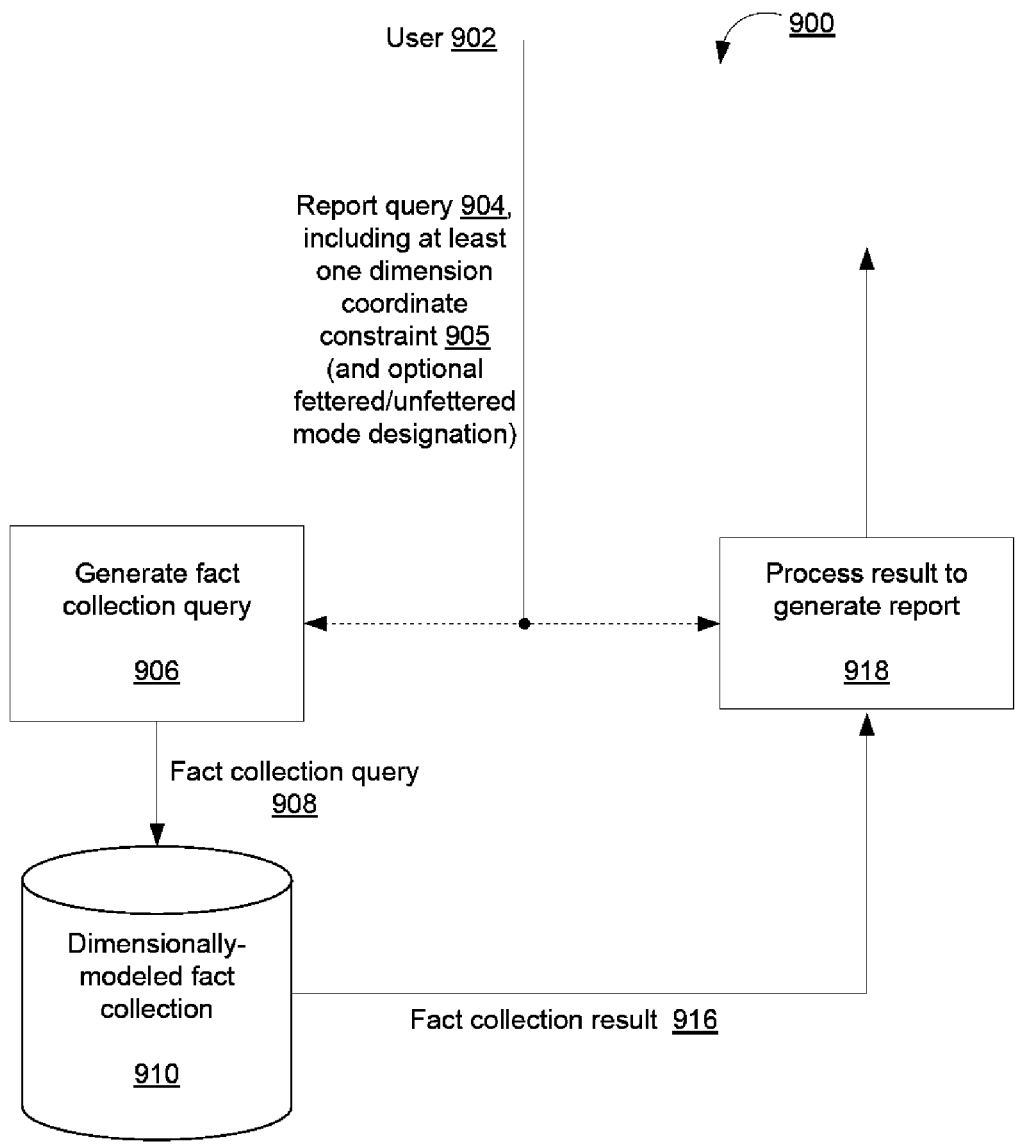
FIG. 9 is a block diagram illustrating an example architecture of a system in which reporting of facts of a dimensionally-modeled fact collection is performed in an unfettered manner.

FIG. 9 is a block diagram illustrating an example architecture of a system 900 in which reporting of facts of a dimensionally-modeled fact collection is performed in an unfettered manner. Referring to FIG. 9, a user 902 may cause a report query 904 to be provided to a fact collection query generator 906. For example, the user 902 may interact with a web page via a web browser, where the web page is served by a report user interface using, for example, a Java Server Page mechanism. In this example, the user 902 interacts with the web page such that the report query 904 is provided to the fact collection query generator 906. The report query 904 includes a dimension coordinate constraint, which may be one or more dimension coordinate constraints.

In general, a dimension coordinate constraint for a dimension of the dimensionally-modeled fact collection specifies coordinates of that dimension of the dimensionally-modeled fact collection. For example, a dimension coordinate constraint may specify coordinates of that dimension of the dimensionally-modeled fact collection by specifying a value of the dimension at a particular grain. Dimension coordinate constraints of the report query 904, then, specify a subset of coordinates of one or more dimensions of the dimensionally-modeled fact collection, on which it is desired to report.

The fact collection query generator 906 processes the report query 904 to generate an appropriate corresponding fact collection query 908, which is presented to the dimensionally-modeled fact collection 910. A result 916 of presenting the fact collection query 908 to the dimensionally-modeled fact collection 910 is processed by a report generator 918 to generate a report corresponding to the report query 904 caused to be provided by the user 902. In particular, the generated report includes an indication of dimensional members as appropriate in view of the dimensional coordinate constraints of the report query 904.

In one example, the dimensionally-modeled fact collection 910 is implemented as a relational database, storing fact data in a manner that is accessible to users according to a ROLAP—Relational Online Analytical Processing—schema (fact and dimension tables). In this case, the fact collection query 908 may originate as a database query, in some form that is processed into another form, for example, which is processed by an OLAP query engine into a fact collection query 908, presented as an SQL query that is understandable by the underlying relational database. This is just one example, however, and there are many other ways of representing and accessing a dimensionally-modeled fact collection.

Processing 918 is applied to the fact collection result 916 to generate a report. The generated report includes an indication of dimension members and facts corresponding to those indicated dimension members. For example, the facts corresponding to those indicated dimension members may be reported in an "unfettered" (i.e., in a manner that is not bound by the dimension coordinate constraint of the report query) such as is discussed above relative to the example of Bill and the Red Team. The facts corresponding to those indicated dimension members may be reported in a "fettered" manner (i.e., in a manner that is bound by the dimension coordinate constraints of the report query 904).

Referring still to FIG. 9, the composition of the generated report may be accomplished by the fact collection query generator 906 particularly generating the fact collection query 908 in accordance with the report query, by the result processing 918 particularly processing the fact collection result (e.g., by applying filtering) in accordance with report query, or by a combination of both.

As also illustrated in FIG. 9, the report query 904 may include an unfettered/fettered mode designation, which may be provided, for example, via a user interface. In some examples, in the absence of such an unfettered/fettered mode designation, the manner in which the facts corresponding to those indicated dimension members are reported may be according to a default mode or according to a preconfigured mode. The fact collection query generator 106 and/or the result processing 918, as appropriate, operate according to the default, preconfigured or designated mode.

Figure 10:
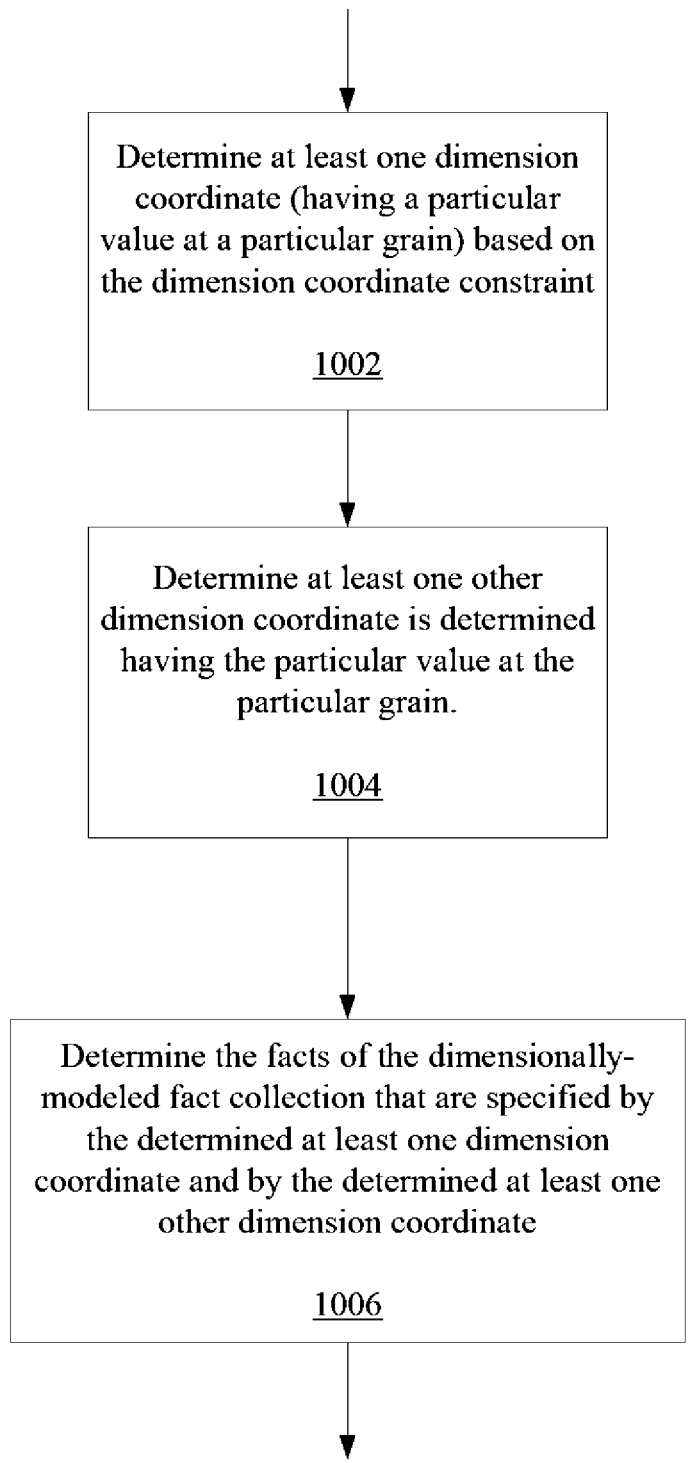
FIG. 10 is a flowchart illustrating a multiple-pass processing method relative to unfettering.

In accordance with one example, a multiple-pass processing is utilized. An example of the multiple-pass processing is illustrated by the flowchart of FIG. 10. In a first pass 1002, every dimension coordinate (which may be one or more dimension coordinates) that satisfies the dimension coordinate constraint is determined. The determined dimension coordinates have a particular value at a particular grain. In another pass 1004, at least one other dimension coordinate (which may be one or more other dimension coordinates) is determined that does not satisfy the dimension coordinates constraint, wherein each of the at least one other dimension coordinates has a value at the associated grain that is the same as the value at the associated grain of one of the dimension coordinates determined in the first pass 1002. In yet another pass 1006, the facts of the dimensionally-modeled fact collection are determined that are specified by the determined dimension coordinates and by the determined at least one other dimension coordinate.

Figures 11A, 11B:
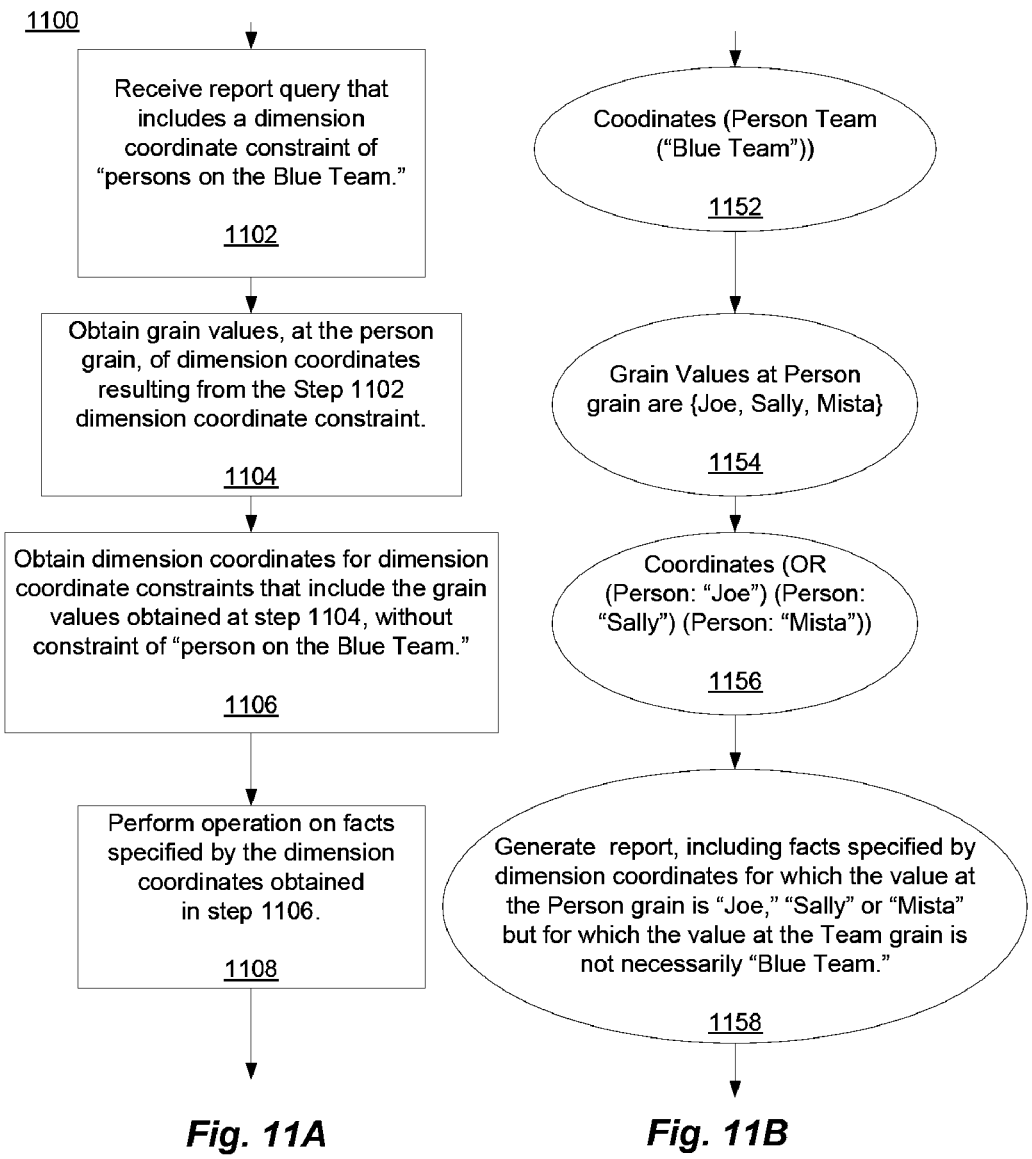
FIGS. 11A and 11B together illustrate an example of generating a report in an unfettered manner.

FIG. 11A illustrates steps of a specific example of generating a report in an unfettered manner. Corresponding FIG. 11B provides supplemental explanatory material for the FIG. 11A example. Referring to FIG. 11A, at step 1102, a report query is received, and the report query includes a dimension coordinate constraint of "persons on the Blue Team." Oval 1152 of FIG. 11B illustrates a formalistic representation of the dimension coordinate constraint and the associated grain. At step 1104 of FIG. 11A, the received report query is processed to obtain all (one or more) dimension coordinates in which the value at the team grain is "Blue Team." Oval 1154 of FIG. 11B indicates that, in the example, the obtained dimension coordinates have a value of "Joe," "Sally" or "Mista" at the Person grain (in addition to having the value of "Blue Team" at the Team grain).

At step 1106, all (one or more) dimension coordinates are obtained that satisfy a replacement dimension coordinate constraint, including the grain values obtained at step 1104 ("Joe," "Sally" or "Mista"), without the constraint of "person on the Blue Team." Oval 1156 illustrates a formalistic representation of the step 1106 dimension coordinate constraint.

At step 1108, operations corresponding to the report query are performed on the facts specified by the dimension coordinates obtained at step 1106. That is, as illustrated by oval 1158, operations to generate the report are performed on the facts specified by all dimension coordinates for which the value at the Person grain is "Joe," "Sally" or "Mista" but for which the value at the Team grain may be, but is not necessarily, "Blue Team."

We have described herein a method/system which considers the phenomenon in which a particular value at a grain associated with a dimension coordinate constraint of a report query may also be the value, at the associated grain, for other dimension coordinates that do not satisfy the dimension coordinate constraint of the report query.

Temporal Mode Specification Disclosure

As discussed in the Background, facts of a dimensionally-modeled fact collection correspond to locations in a dimensional data space according to which the dimensionally-modeled fact collection is modeled. Moreover, the relationship of grains of a dimension may change over time—a phenomenon known as "slowly changing dimensions" (and also referred to herein as "temporal dimensions"). As also mentioned in the Background, the inventors have realized that it is desirable to consider the phenomenon of slowly changing dimensions in the process of generating a report for a dimensionally-modeled fact collection.

We thus describe herein various methods that consider the phenomenon of temporal dimensions in the process of reporting on facts of a dimensionally-modeled fact collection. It is noted that, while consideration of the facts (or the presence or absence thereof) relative to various coordinates is not precluded in the described methods, the focus of the description is with respect to the coordinates themselves, including the grain relationships. If not evident already, this distinction should become evident upon further reading of this patent application.

Before describing the methods, however, we give more background to the issue of temporal dimensions (slowly changing dimensions), using an example relative to the EMPLOYEE dimension, mentioned above, intended to represent an organizational chart of a company. The EMPLOYEE dimension comprises the grains of ORGANIZATION, DIVISION, TEAM and PERSON. In this example, various people have moved onto and off of the Red Team. This phenomenon is modeled by EMPLOYEE dimension coordinates having value "Red Team" at grain TEAM, and having values indicative of those people at grain PERSON; these dimension members and that grain relationship are further qualified by the times during which that relationship obtained. These dimension members may be represented as follows:

| value at TEAM grain | value at PERSON grain | date range for which this value at PERSON grain has the value of "Red Team" at the TEAM grain |
|---|---|---|
| Red Team | Joe | January 2005-March 2005 |
| Red Team | Mary | March 2005-July 2005 |
| Red Team | Bill | June 2005-January 2006 |

Continuing with the example, consider that the current date is January 2006, and a user requests a report, for each month of the first quarter of 2005, for each person on the Red Team, that is, with respect to locations specified by coordinates in the EMPLOYEE dimension at the PERSON grain, whose value at the TEAM grain is "Red Team." The particular facts that correspond to specified locations, or even whether there exist such facts corresponding to particular locations, is not relevant for the purpose of the example.

It is assumed that the report is to have two axes: an X axis for an indication of each month of the first quarter of 2005, and a Y axis for an indication of each person on the Red Team. However, given that the EMPLOYEE dimension is a temporal dimension, it is ambiguous as to what values at the PERSON grain should be indicated on the Y axis of the report. That is, while the TIME dimension coordinates of the report are constrained to have value "Q1-2005" at the QUARTER grain, it is ambiguous for what temporal extent of the EMPLOYEE dimension the user is requesting the report. More specifically, it is ambiguous which of the values at the PERSON grain of the EMPLOYEE dimension should be indicated on the Y axis of the report, given that the EMPLOYEE dimension coordinates of the report are constrained to have value "Red Team" at the TEAM grain.

For example, Bill was not on the Red Team at all during the first quarter of 2005. Perhaps Bill should not be included on the report since Bill was not on the Red Team during the first quarter of 2005. More specifically, referring to the TIME dimension coordinate constraints of the report being "first quarter of 2005," there is no member of the EMPLOYEE dimension having value "Bill" at grain PERSON and value "Red Team" at grain TEAM within the temporal extent corresponding to "first quarter of 2005."

But, on the other hand, perhaps Bill should indeed be included on the report, since Bill is currently on the Red Team (remember, it is assumed that the current date is January 2006). More specifically, within the temporal extent corresponding to "January 2006," there is indeed a member of the EMPLOYEE dimension having value "Bill" at grain PERSON and value "Red Team" at grain TEAM.

As another example, Mary was on the Red Team only during part (March 2005) of the first quarter of 2005. Particularly for January 2005 and February 2005, perhaps Mary should not be included on the report. Or, perhaps, for January 2005 and February 2005, Mary should be included, even if Mary was on another team for those months, since Mary was on the Red Team during at least part of the first quarter of 2005.

It can be seen, then, given that the grain relationships of the EMPLOYEE dimension can change over time, that there is ambiguity as to which values at one grain of the EMPLOYEE dimension (PERSON) should be considered related to values at another grain (TEAM) of the EMPLOYEE dimension. More particularly, there is ambiguity as to the time extent to utilize in determining, given constraints expressed, at the TEAM grain of the EMPLOYEE dimension, upon the EMPLOYEE dimension coordinates of the report, which values at the PERSON grain of the EMPLOYEE dimension should be considered to satisfy those constraints, and should therefore be represented on the report.

In accordance with an aspect, a report query specifies a temporal mode, in addition to specifying at least one dimension coordinate constraint. The specified temporal mode is processed to determine a time extent descriptor. The processing of the specified temporal mode may be in view of the dimension coordinate constraints and/or a context. A fact collection query is generated, and a result of providing the fact collection query to the dimensionally-modeled fact collection is processed.

The processed result includes an indication of dimensional values as appropriate in view of the time information from the time extent descriptor. More particularly, the time extent descriptor includes information about a period of time (i.e., from a "starting time" to an "ending time") to utilize in determining which values at one grain of a dimension should be considered to be also present at another grain (e.g., a coarser grain) of that dimension.

Figure 12:
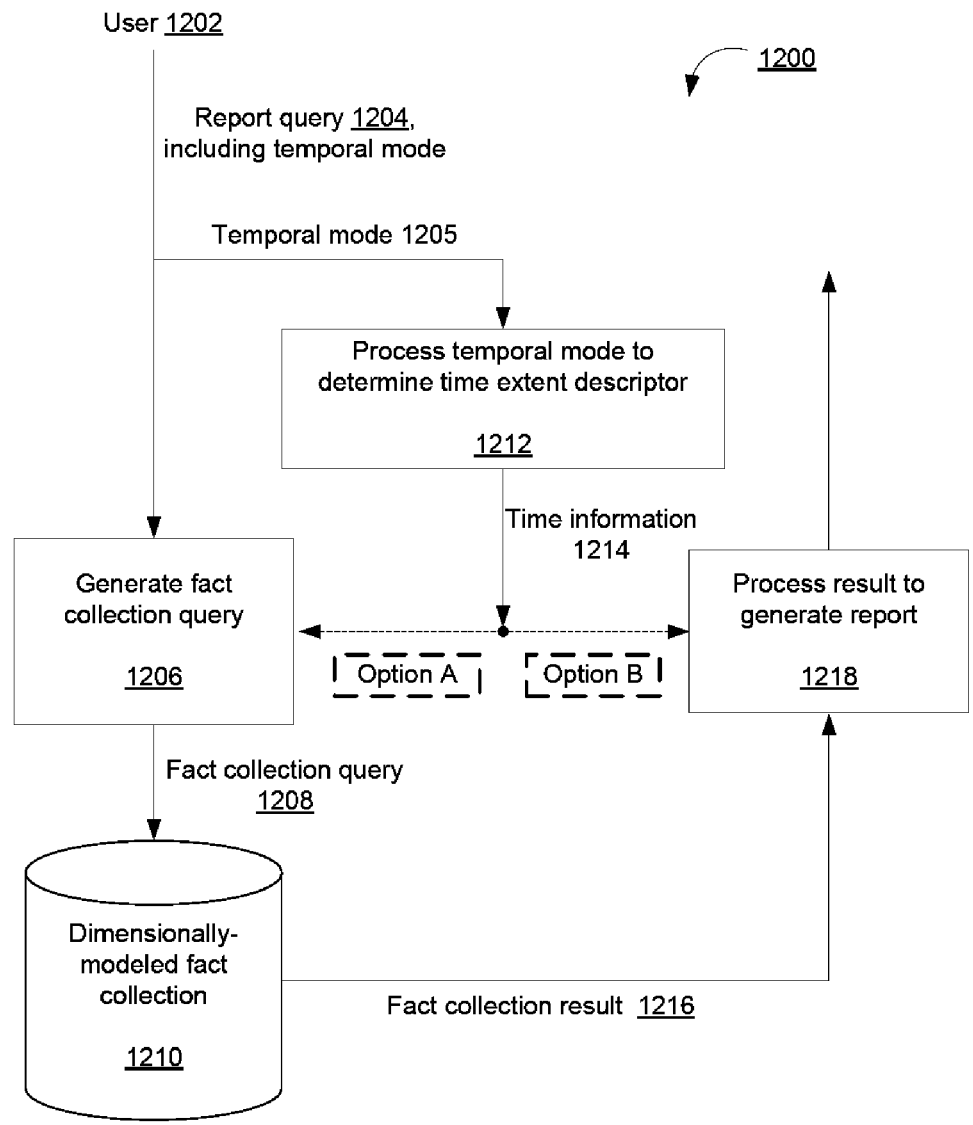
FIG. 12 is a block diagram illustrating an example architecture of a system in which a temporal mode, as part of report query to a dimensionally-modeled fact collection, is processed to determine a time extent descriptor useable to report on the facts of the dimensionally modeled fact collection.

FIG. 12 is a block diagram illustrating an example architecture of a system 100 in which the processing of the temporal mode, to determine a time extent descriptor, as well as generating a fact collection query, may take place. Referring to FIG. 12, a user 1202 may cause a report query 1204 to be provided to a fact collection query generator 1206. For example, the user 1202 may interact with a web page via a web browser, where the web page is served by a report user interface using, for example, a Java Server Page mechanism. In this example, the user 1202 interacts with the web page such that the report query 1204 is provided to the fact collection query generator 1206. The report query 1204 includes a temporal mode specification and at least one dimension coordinate constraint.

The temporal mode specification of the report query 1204 is a symbolic representation of a function to determine a time extent descriptor. In a simple example, the temporal mode specification may be human-readable text such as "Now," "Beginning of Report" or "End of Report." The temporal mode processor 1212 processes the temporal mode specification 1205, provided as part of the report query 1204, to determine a time extent descriptor. (Later, we discuss in greater detail how these temporal mode specifications, and others, may be processed according to a function to determine a time extent descriptor.)

We now discuss the dimension coordinate constraints of the report query 1204. In general, a dimension coordinate constraint for a dimension of the dimensionally-modeled fact collection specifies coordinates of that dimension of the dimensionally-modeled fact collection. For example, a dimension coordinate constraint may specify coordinates of that dimension of the dimensionally-modeled fact collection by specifying a value of the dimension at a particular grain. Dimension coordinate constrains of the report query 1204, then, specify a subset of coordinates of one or more dimensions of the dimensionally-modeled fact collection, on which it is desired to report.

The fact collection query generator 1206 processes the report query 1204 to generate an appropriate corresponding fact collection query 1208, which is presented to the dimensionally-modeled fact collection 1210. A result 1216 of presenting the fact collection query 1208 to the dimensionally-modeled fact collection 1210 is processed by a report generator 1218 to generate a report corresponding to the report query 1204 caused to be provided by the user 1202. In particular, the generated report includes an indication of dimensional members as appropriate in view of the time information 1214 from the time extent descriptor 1212, determined from the temporal mode 1205.

In one example, the dimensionally-modeled fact collection 1210 is implemented as a relational database, storing fact data in a manner that is accessible to users according to a ROLAP—Relational Online Analytical Processing—schema (fact and dimension tables). In this case, the fact collection query 108 may originate as a database query, in some form which is processed into another form, for example, which is processed by an OLAP query engine into a fact collection query 1208, presented as an SQL query that is understandable by the underlying relational database. This is just one example, however, and there are many other ways of representing and accessing a dimensionally-modeled fact collection.

FIG. 12 illustrates two modes of operation of the system 100, indicated in FIG. 12 as "Option A" and "Option B." Basically, "Option A" refers to applying the time information 114 from the time extent descriptor to the processing 106 to generate the fact collection query 1208. "Option B" refers to applying the time information 1214 from the time extent descriptor to the processing 1218 to generate the report. In accordance with either option, the generated report includes an indication of dimensional members as appropriate in view of the time information 1214 from the time extent descriptor 1212, determined from the temporal mode 1205.

Having generally described a system and process according to which a generated report includes appropriate indications of dimensional members, we now provide some illustrations of the concept with examples. Furthermore, from the examples, it can be further seen how the focus of the described system and process is with respect to the coordinates themselves, including the grain relationships, and not with consideration of the facts (or the presence or absence thereof) relative to various coordinates.

In the following examples, illustrated in FIGS. 13 to 16, processing is only in one dimension, the EMPLOYEE dimension. As discussed above, the EMPLOYEE dimension is a temporal dimension, since the relationship of grains of the EMPLOYEE dimension may change over time. Further, for examples in which it is relevant, the context includes an indication of the current date being 16 Mar. 2005. Typically, the context is relevant for those report queries in which the function by which the temporal mode is processed to determine a time extent descriptor has, as a required parameter, some indication of the environment in which the report query is made. While the function according to which the temporal mode may be processed, to determine the time extent descriptor, may be arbitrarily defined, in the examples, we apply functions that correspond to the ordinarily understood meaning of the example specified temporal modes.

The report queries in the examples of FIGS. 13 to 16 all request values of coordinates at the PERSON grain of the EMPLOYEE dimension by constraining those coordinates to have a value of "Red Team" at the TEAM grain. That is, the dimension coordinate constraint broadly indicates a subset of the dimensionally modeled fact collection specified by coordinates at least having a value of "Red Team" at the TEAM grain of the EMPLOYEE dimension. As can be seen from the examples, without knowing the time information from a time extent descriptor determined by processing the specified temporal mode, it is ambiguous which of those coordinates having a value of "Red Team" at the TEAM grain of the EMPLOYEE dimension are actually being requested.

Figure 13:
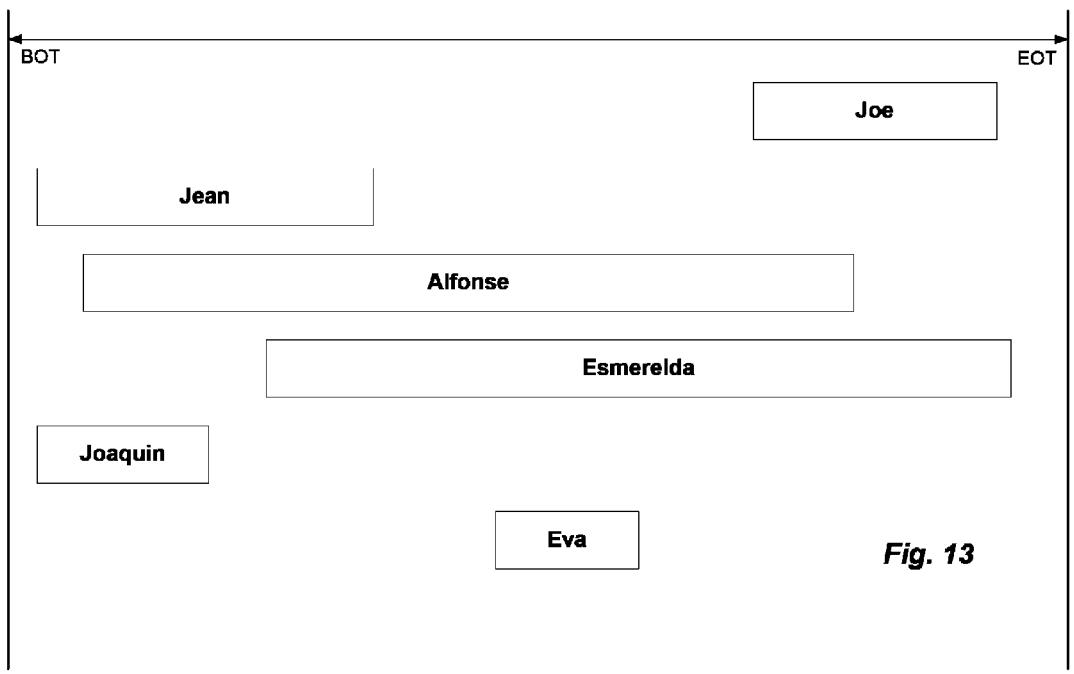
FIGS. 13 to 16 illustrate how various different temporal modes may be applied in a simple example, where processing is only in one dimension.

FIG. 13 illustrates an example of processing a report query in which the specified temporal mode is "all time." In some sense, this may be considered the same as not providing a temporal mode at all. With respect to the time information (1214, in FIG. 12) from the time extent descriptor resulting from processing (1212, in FIG. 12) the specified temporal mode (1205, in FIG. 12), the "starting time" is theoretically the beginning of time (BOT) and the ending time is theoretically the end of time (EOT). As a practical matter, the "starting time" may be set to a time value that is at least as early as the earliest time for which there exists a coordinate of the EMPLOYEE dimension that has the value "Red Team" at the TEAM grain, and the "ending time" may be set to a time value that is at least as late as the latest time for which there exists a coordinate of the EMPLOYEE dimension that has the value "Red Team" at the TEAM grain.

The resulting report should thus include indications of dimension coordinates (e.g., labels) for all values, at the PERSON grain, of coordinates having the value of "Red Team" at the TEAM grain, at any time. Since FIG. 13 includes all the people who are members of the Red Team at any time during "all time," the resulting report should include indications of dimension coordinates for Joe, Jean, Alfonse, Esmerelda, Joaquin and Eva.

It should be noted that the report query may not even specify facts to be reported. As noted above, the focus of the description is with respect to the coordinates themselves, including the grain relationships. If, for example, the report query did not specify facts to be reported, the resulting report may contain labels only, but no facts. This can be useful, for example, to report on the grain relationships themselves (in consideration of their temporal nature), without consideration for the underlying facts at the locations specified by the coordinates existing at those grains.

Figure 14:
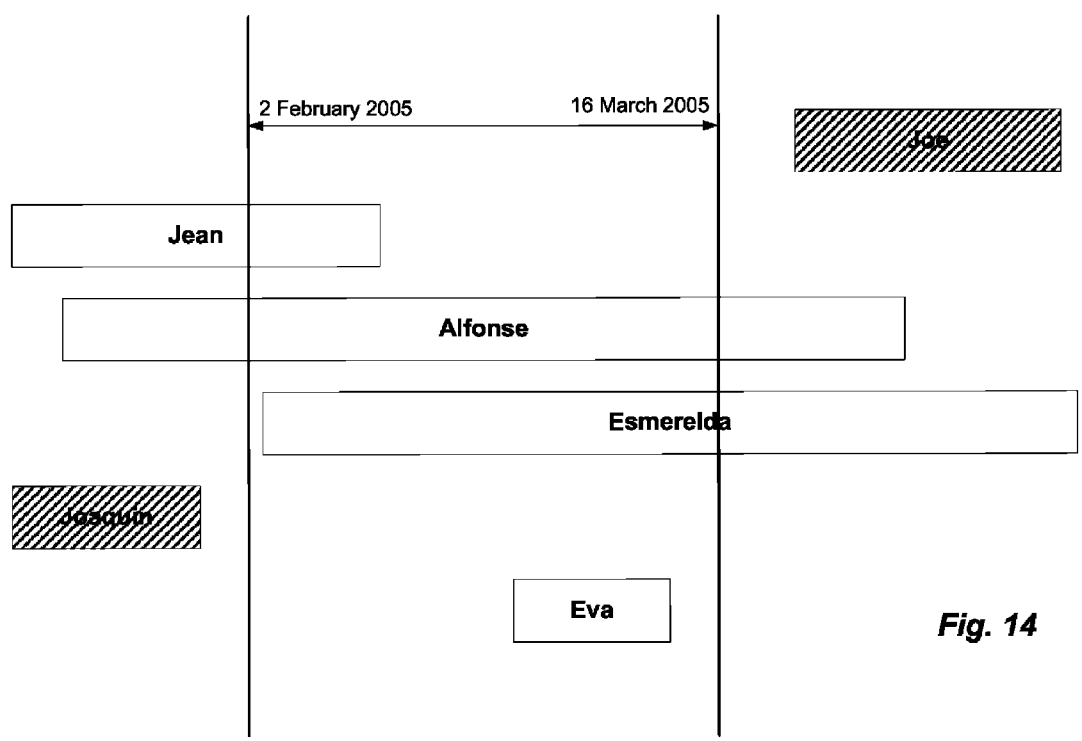

Now, turning to FIG. 14, this figure illustrates an example of processing a report query in which the temporal mode is specified with respect to the time coordinates of the report. In the example, the time coordinates of the report are 2 Feb. 2005 ("starting time") to 16 Mar. 2005 ("ending time"). It can be seen, then, that during the time period defined by the "starting time" and the "ending time," neither Joaquin nor Joe are members of the Red Team. In one example, the multidimensional fact collection includes metadata that provides information from which the temporal characteristics of the grain relationships can be discerned. (See, for example, the article entitled Kimball Design Tip #8: Perfectly Partitioning History With The Type 2 Slowly Changing Dimension," available at http://www.kimballgroup.com/html/designtipsPDF/DesignTips2000%20/KimballDT8 Perfectly.pdf, which describes augmenting dimension records with "time stamps" to temporally characterize the dimension records.) The resulting report should thus include indications of dimension coordinates for Jean, Alfonse, Esmerelda, and Eva, but should not include indications of dimension coordinates for Joaquin and Joe.

Figure 15:
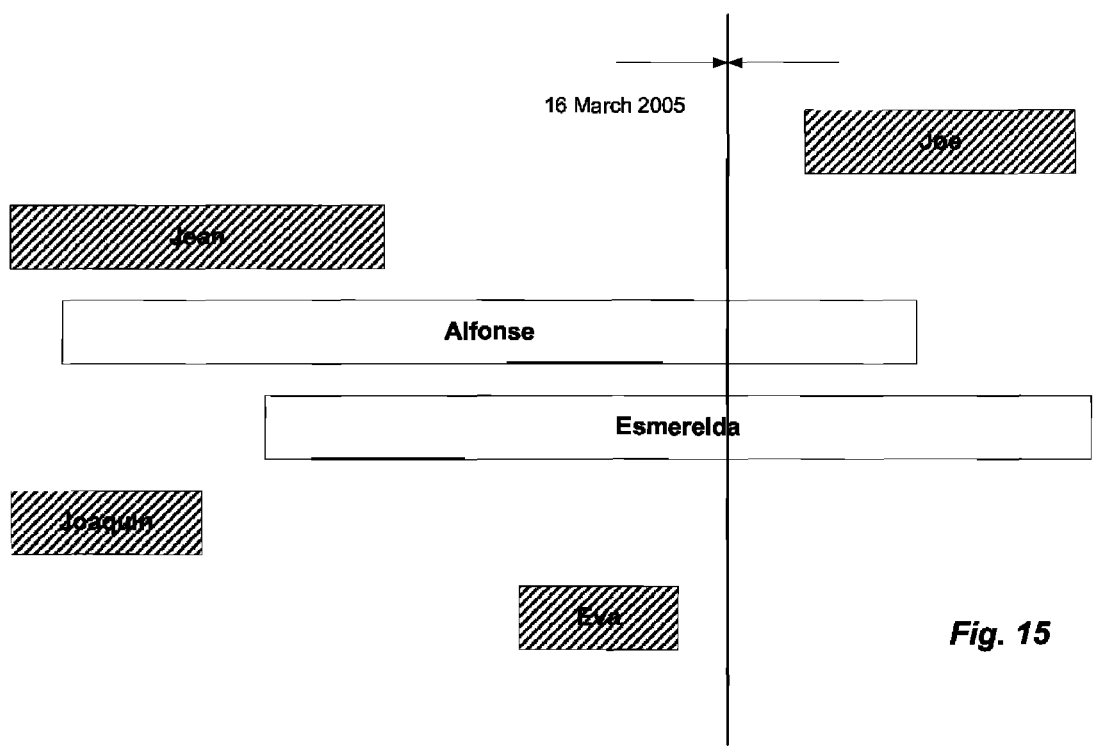

FIG. 15 illustrates an example in which the temporal mode is specified as "now," while the report coordinates are the same as in the FIG. 14 example. Unlike the FIG. 14 example, the context is used in determining the time information from the extent descriptor from the temporal mode. It can be seen that, during the time period defined by the starting time of "16

Mar. 2005" and the ending time of "16 Mar. 2005" (remembering that the current time is "16 Mar. 2005"), only Alfonse and Esmerelda are members of the Red Team. Joe, Jean, Joaquin and Eva are not members of the Red Team during this time period. The resulting report should thus include indications of dimension coordinates for Alfonse and Esmerelda, but should not include indications of dimension coordinates for Joe, Jean, Joaquin and Eva. The time extent descriptor in this example is independent of the report coordinates.

Figure 16:
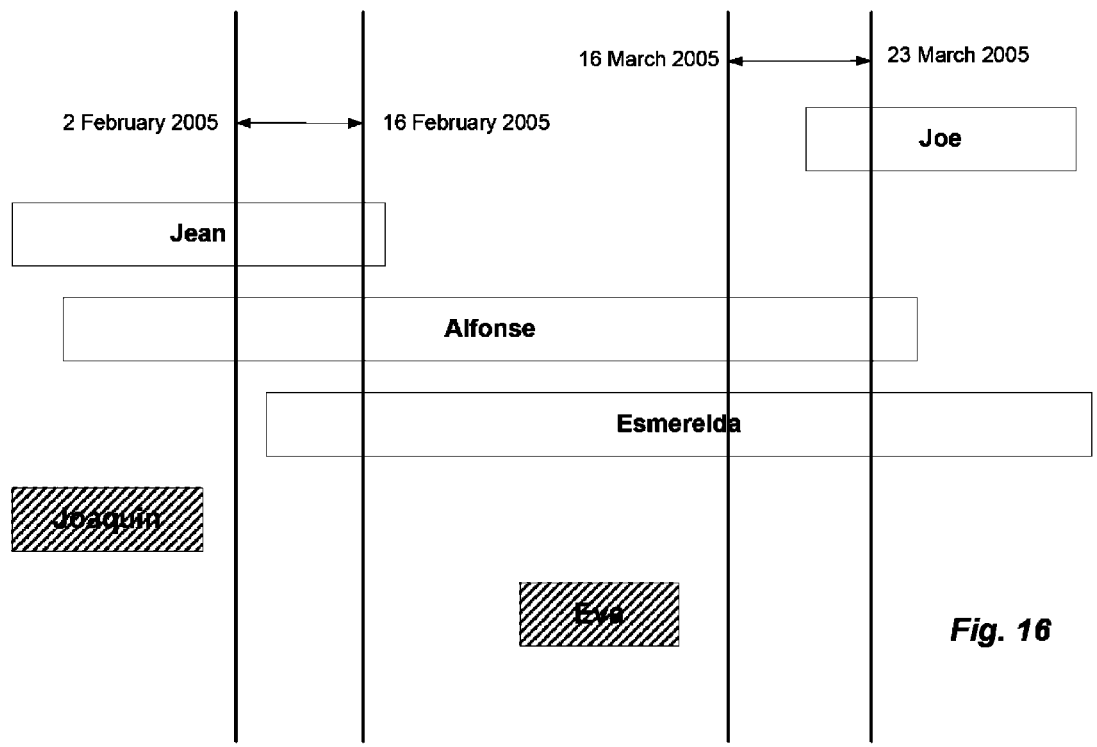

In a final example, illustrated in FIG. 16, the temporal mode is specified as a discontinuous span of three weeks. While the situation is somewhat contrived, it is viable nonetheless. The specification of the temporal mode depends neither on the report coordinates nor on the context. The time information from the extent descriptor includes two separate pairs of starting and ending times. The first pair includes a "starting time" of 2 Feb. 2005 and an "ending time" of 15 Feb. 2005. The second pair includes a "starting time" of 16 Mar. 2005 and an "ending time" of 23 Mar. 2005. During these time periods, Joe, Jean, Alfonse, and Esmerelda are members of the Red Team. During these time periods, Joaquin and Eva are not members of the Red Team.

It should be realized, then, from the previous examples, that the specified temporal mode may be processed in view of the context in which the report query is made, but for other queries, the specified temporal mode may be processed completely independent of such a context. The examples also illustrate that the specified temporal mode may be processed in view of the TIME coordinates of the report, but for other queries, the specified temporal mode may be processed completely independent of the TIME coordinates of the report. Furthermore, regardless of the manner in which the specified temporal mode may be processed, the resulting indications of dimension coordinates on the report are not dependent on the facts (or the presence or absence thereof) associated with the various coordinates indicated on the report.

In some examples, the specification of the temporal mode is via a user interface. FIG. 17 illustrates an example of a report display screen 1702, including functionality for a report configuration menu 1704 to specify, among other things, the temporal mode of the report query. In particular, the "labels as of:" portion 1706 of the configuration menu 1704 provides a listing of various possible temporal modes. Some of these temporal modes have been discussed with reference to FIGS. 13 to 16. A user may interact with the configuration menu 1704 to choose one of the listed temporal modes in the portion 1706, and the specified temporal mode is provided as part of the report query (see, e.g., the report query 1204 in FIG. 12). As discussed above, the temporal mode specification is a symbolic representation of a function to determine a time extent descriptor. The portion 1706 of the configuration menu 1704, then, provides a user-friendly way to choose the desired function.

We have described herein a method/system that considers the phenomenon of slowly changing dimensions in the process of reporting on facts of a collection of facts organized as, or otherwise accessible according to, a dimensionally-modeled fact collection. More specifically, we have described a method/system whereby a report query may specify a temporal mode, and the specified temporal mode may be processed to determine a time extent descriptor. A processed result of querying the dimensionally-modeled fact collection includes appropriate dimensional labels in view of the time information from the time extent descriptor.

Furthermore, we have more generally described a method in which processing an evaluative query to determine performance facts and/or performance parameters, on which determination of the evaluative score is based, includes processing the temporal relationships of finer grain values to coarser grain values for the dimension coordinates. By considering the temporal relationships of finer grain values to coarser grain values for dimension coordinates in the dimensionally-modeled fact collection, the evaluative score may be determined in a manner that provides a more accurate evaluation, in light of historical occurrences represented by the dimensionally-modeled fact collection.

We now provide an example that illustrates and ties together some concepts described above. The example considers a hypothetical team, TeamA, in the month of March, 2007. Agents Thru and Vayk were assigned to TeamA for the entire month, although Vayk was on vacation for the whole month. Agent Erly began the month assigned to TeamA, but transferred to TeamC mid-month. Agent Late began the month assigned to TeamB, but transferred onto TeamA mid-month. Agent Irrl once in the distant past was assigned to TeamA, but was assigned to TeamC for the entirety of March.

These entries are in the temporal Organization dimension, then:

Members of the Organization dimension, values at Agent: Team grains:
Thru:TeamA
Late:TeamA
Erly:TeamA
Irrl:TeamA
Vayk:TeamA
Late:TeamB
Irrl:TeamC
Erly:TeamC Now, looking at performance data recorded for these dimension members, aggregated up to the month level. The raw facts for March-2007 are::

|  | Sales | Calls | QScore | QPoss |
|---|---|---|---|---|
| Thru:TeamA | 10,000 | 1,600 | 450 | 500 |
| Late:TeamA | 3,000 | 500 | 200 | 300 |
| Erly:TeamA | 5,000 | 800 | 250 | 300 |
| Irrl:TeamA | — | — | — | — |
| Vayk:TeamA | — | — | — | — |
| Late:TeamB | 3,000 | 500 | 200 | 300 |
| Irrl:TeamC | 8,000 | 600 | 150 | 300 |
| Erly:TeamC | 5,000 | 800 | 150 | 200 |

A straightforward OLAP report about TeamA data during the month of March-2007, aggregated only up to the level of each agent, might look like the following.

Straightforward OLAP:

|  | Sales | Calls | QScore | QPoss |
|---|---|---|---|---|
| Thru:TeamA | 10,000 | 1,600 | 450 | 500 |
| Late:TeamA | 3,000 | 500 | 200 | 300 |
| Erly:TeamA | 5,000 | 800 | 250 | 300 |
| Irrl:TeamA | — | — | — | — |
| Vayk:TeamA | — | — | — | — |

It may be noticed that all coordinates possess the value TeamA at grain Team, which is how they satisfy the coordinate constraint defining this report. Thus, agent Irrl, who was never assigned to TeamA during March (the time of this report) nonetheless is included as a member (i.e., there is a label for Irrl on the report). By specifying the temporal extent as "the time of the report", this can be improved on a little. This technique effectively removes agent Irrl from the report.
Temporal Extent=Report Duration:

|  | Sales | Calls | QScore | QPoss |
|---|---|---|---|---|
| Thru:TeamA | 10,000 | 1,600 | 450 | 500 |
| Late:TeamA | 3,000 | 500 | 200 | 300 |
| Erly:TeamA | 5,000 | 800 | 250 | 300 |
| Vayk:TeamA | — | — | — | — |

Alternately, the temporal extent could be specified as "the end of the report" to just show those agents still assigned to TeamA at the end of March:
Temporal Extent=Report End:

|  | Sales | Calls | QScore | QPoss |
|---|---|---|---|---|
| Thru:TeamA | 10,000 | 1,600 | 450 | 500 |
| Late:TeamA | 3,000 | 500 | 200 | 300 |
| Vayk:TeamA | — | — | — | — |

But, in all these cases, it is noticed that the various agents have very different values for their performance facts. This is because some of the facts are excluded for these agents—specifically, facts reflecting performances while those agents were assigned to other teams. However, by "unfettering" the data query for the agents once the set of agents is determined, from the Team-level constraint originally used to define the report, this allows all data for these agents for the month of March to be included. Keeping the temporal extent as "end of report", but unfettering the query, what is then obtained is:
Unfettered

|  | Sales | Calls | QScore | QPoss |
|---|---|---|---|---|
| Thru:* | 10,000 | 1,600 | 450 | 500 |
| Late:* | 6,000 | 1,000 | 400 | 600 |
| Vayk:* | — | — | — | — |

Now it can be seen that agent Late's number has gone up (i.e., include performance early in the month while not on TeamA) while agent Thru's numbers have stayed the same.

In some examples, it is desirable to use the performance numbers to establish a basis of comparison for agent performance. For example, the "average performance" facts for this Team may be computed—defined, in this example, as the mean of the performance metric values using a statistical population comprising a Team's Agent-level members, though other statistical measures may be employed. Using the Agent-level, unfettered facts from "Unfettered" above, what is obtained is:
Unfettered AgtAvg: (not Considering Agents Such as Vayk for Whom there was No Data

|  | AgtAvg_Sales | AgtAvg_Calls | AgtAvg_QScore | AgtAvg_QPoss |
|---|---|---|---|---|
| TeamA | 8,000 | 1,300 | 425 | 550 |

This is contrasted with values that would be computed without the unfettered data—that is, using just data associated with coordinates having a value of TeamA at the Team grain.
Vanilla OLAP AgtAvg

|  | AgtAvg_Sales | AgtAvg_Calls | AgtAvg_QScore | AgtAvg_QPoss |
|---|---|---|---|---|
| TeamA | 6,000 | 967 | 300 | 367 |

Clearly the unfettered reporting and average give (a) a better reflection, in least in some sense, of individual agent performance, and (b) a better measure against which to compare the agent's performance than do the vanilla OLAP results.

We now consider a slightly different presentation of this same underlying idea. It is desired to see the performance of many individual agents—say, all the agents at a given Site, SiteOne—and be able to compare each agent to a standard of performance. Specifically, it is desired to use the same standard of performance as before: the performance of an average individual working on the same Team.

An "average agent's" performance for TeamA has been computed. This is also done for all known Teams: TeamA, TeamB, and TeamC.

To do this involves effectively querying for all the agents in SiteOne—i.e., using a dimension coordinate constraint expressed at the Site level. This is analogous to the earlier constraint expressed at the Team level to select just agents on TeamA. (As such, it also comes with analogous considerations of temporal extent and fettering if there is temporal motion of Agents among Sites; which is ignored for this discussion.)

Performance facts for Agents in SiteOne:

|  | Sales | Calls | QScore | QPoss |
|---|---|---|---|---|
| Thru:SiteOne | 10,000 | 1,600 | 450 | 500 |
| Late:SiteOne | 6,000 | 1,000 | 400 | 600 |
| Erly:SiteOne | 10,000 | 1,600 | 400 | 500 |
| Irrl:SiteOne | 8,000 | 600 | 150 | 300 |
| Vayk:SiteOne | — | — | — | — |

It may be desired to add to this report, for each agent and for each type of fact, the aforementioned average fact value—that is, the value for an average Agent in the Team. But which Agent numbers contribute to which Team's average? And to which Team's average should each agent be compared?

Teams' Averages—What Goes Here?:

|  | AgtAvg_Sales | AgtAvg_Calls | AgtAvg_QScore | AgtAvg_QPoss |
|---|---|---|---|---|
| TeamA:SiteOne | ??? | ??? | ??? | ??? |
| TeamB:SiteOne | ??? | ??? | ??? | ??? |
| TeamC:SiteOne | ??? | ??? | ??? | ??? |

Before, when membership in TeamA was a given (because of that coordinate constraint), the options were just around inclusion or exclusion of Agent-level members in the report (temporal extent), and inclusion or exclusion of extra data for those agents outside of the TeamA constraint (unfettering). But when taking the average for the members of that single Team, it was clear to which average each Agent's performance fact was contributing: that single Team's.

Now that many teams are in the scope of the query, there is a bit of a dilemma. One could do the straightforward OLAP processing, and evaluate a simple Team level aggregate along the lines of SUM(fact)/COUNT(fact).

Looking at those operands aggregated "naturally" to the Team grain:

Team-Level Aggregate Facts—the Simple OLAP Way:

|  | SUM(x) | | | | |
|---|---|---|---|---|---|
|  | Sales | Calls | QScore | QPoss | COUNT(x) |
| TeamA:SiteOne | 18,000 | 2,900 | 900 | 1100 | 3 |
| TeamB:SiteOne | 3,000 | 500 | 200 | 300 | 1 |
| TeamC:SiteOne | 13,000 | 1,400 | 300 | 500 | 2 |

Then the "bad average" is defined as above, i.e.,

BadAvg_x::=SUM(x)/COUNT(x)

And it is simple to compute:
Teams' Averages—the Simple OLAP Way:

|  | BadAvg_Sales | BAdAvg_Calls | BadAvg_QScore | BadAvg_QPos | COUNT(x) |
|---|---|---|---|---|---|
| TeamA:SiteOne | 6,000 | 967 | 300 | 367 | 3 |
| TeamB:SiteOne | 3,000 | 500 | 200 | 300 | 1 |
| TeamC:SiteOne | 6,500 | 700 | 150 | 250 | 2 |

It may be noticed, then, that the TeamA row contains the same values obtained for TeamA using a "fettered" query before, in "Vanilla OLAP AgtAvg".

These numbers all seem low compared to the "Unfettered AgtAvg" we computed for TeamA. The reason is that none of these averages reflects the activity of a WHOLE NUMBER of agents for an ENTIRE MONTH. For example, performance facts for Agent Erly are contributing partly to the average for TeamA, and partly to the average for TeamC.

There are ways around this. One could weight the average by a measure of how many days of participation the performance facts represented, for example. With the methods described, this need not be done, however. Further, an aggregate (Team) can be credited with the ENTIRETY of one of its members performances for a time period. And it can be determined which aggregate is used when comparing to a given person.

Turning back to the example, it can be remembered that there are only five Agents in the sample fact set, and only four of them generate any facts during March. Regrouping the dimension members:

Members of the Organization Dimension, at Agent:Team Grains, Regrouped:
Thru:TeamA
Vayk:TeamA [XXX contributes no data during March]
Late:TeamA
Late:TeamB
Erly:TeamA
Erly:TeamC
Irrl:TeamA [XXX long before March]
Irrl:TeamC If one would like all of a given Agent's data for March to contribute to just one Team's average, how is this done? For some agents, it is fairly evident—e.g., TeamA is the only possible choice for Agent Thru. For others, it's ambiguous. For example, Agent Erly's data could be seen as contributing to TeamA's average, or alternately to TeamC's average, as he was assigned to both of them during March.

Determining a one-to-one mapping between the fine-grained values (Agents) and coarse-grained values is called disambiguation. It is typically performed using a time-based rule, like "choose the latest association". ("Chambering" could also be discussed relative to this mapping to March.) Using this disambiguation rule, the following mapping is derived.

Disambiguated Agent—>Team Mapping for the Organization Dimension
Thru—>TeamA
Vayk—>TeamA [XXX contributes no data during March]
Late—>TeamA
Erly—>TeamC
Irrl—>TeamC This mapping is used to determine which Agents' data contribute to each Team's overall statistics. In contrast to the simple OLAP approach, the result is:

Agent Level Facts Aggregated to Disambiguated Team:

|  | SUM(x) | | | | |
|---|---|---|---|---|---|
|  | Sales | Calls | QScore | QPoss | COUNT(x) |
| TeamA:SiteOne | 16,000 | 2,600 | 850 | 1100 | 2 |
| TeamB:SiteOne | — | — | — | — | 0 |
| TeamC:SiteOne | 18,000 | 2,200 | 600 | 800 | 2 |

And the average is again simple to compute:
Average Agent within Disambiguated Teams:

|  | AgtAvg_Sales | AgtAvg_Calls | AgtAvg_QScore | AgtAvg_QPoss | COUNT(x) |
|---|---|---|---|---|---|
| TeamA:SiteOne | 8,000 | 1,300 | 425 | 550 | 2 |
| TeamB:SiteOne | — | — | — | — | 0 |
| TeamC:SiteOne | 9,000 | 1,100 | 300 | 400 | 2 |

The disambiguated mapping is used once more to determine which of these averages to use as a standard of performance for a given Agent. That is, the average for the Team to which all that Agent's data was contributed is used under the same disambiguation mapping. This allows completion of the Agent-level performance comparison for all the agents within SiteOne.

As an aside, to make the two views more consistent (i.e., single-team versus all agents with the site), it may be worth employing a "best practice": have temporal extent rules follow the disambiguation rules. e.g., temporal extent is "latest association" and disambiguation rule is "end-of-report." That is, notice that the TeamA's average is the same as the one computed in "Unfettered AgtAvg" above. This is because the choice of temporal extent="end of report" for that computation, which delivers comparable semantics to choosing the disambiguation rule "latest association" in the broader "Average agent within disambiguated Teams" analysis just completed. In the former case, all data for each individual was used (i.e., unfettered), but just for those individuals associated with TeamA at the end of the period. In the latter case, all data for each individual was used (because all the data is associated with some SiteOne individual), and when picking which average they contributed to, the latest association was used (disambiguation). This makes the numbers match up between the views.

Performance Facts & Benchmarks for Agents In SiteOne:

|  | Sales | AgtAvg_Sales | Calls | AgtAvg_Calls | QScore | AgtAvg_QScore | QPoss | AgtAvg_QPoss |
|---|---|---|---|---|---|---|---|---|
| Thru:SiteOne | 10,000 | 8,000 | 1,600 | 1,300 | 450 | 425 | 500 | 550 |
| Late:SiteOne | 6,000 | 8,000 | 1,000 | 1,300 | 400 | 425 | 600 | 550 |
| Erly:SiteOne | 10,000 | 9,000 | 1,600 | 1,100 | 400 | 300 | 500 | 400 |
| Irrl:SiteOne | 8,000 | 9,000 | 600 | 1,100 | 150 | 300 | 300 | 400 |
| Vayk:SiteOne | — | 8,000 | — | 1,300 | — | 425 | — | 550 |

What is claimed is:

1. A method of processing a performance query to a dimensionally-modeled fact collection by processing dimension coordinates that exist within a dimensional data model, wherein facts of the dimensionally-modeled fact collection are accessible according to the dimensional data model and wherein the dimension coordinates have a first particular grain ("finer grain") that is finer than a second particular grain ("coarser grain"), the method to determine an evaluative score for a particular value at the finer grain ("finer grain value") based on performance facts for dimension coordinates associated with the particular finer grain value, the method comprising:
determining at least one performance parameter, relative to a particular value at the coarser grain ("coarser grain value"), against which to measure the performance facts associated with the finer grain value, including processing temporal relationships of finer grain values to coarser grain values for the dimension coordinates, wherein processing the temporal relationships of finer grain values to coarser grain values includes processing data indicative of how relationships of the finer grain values to coarser grain values change over time and, based thereon, processing performance facts based on performance facts for dimension coordinates having the particular coarser grain value;
determining the evaluative score for the particular finer grain value based on performance facts of dimension coordinates having the particular finer grain value, in view of the at least one determined performance parameter;
wherein processing the temporal relationships of finer grain values to coarser grain values includes performing one or both of unfettering and disambiguation to account for a changing relationship of grains so that the evaluative score is adjusted to provide a different type of evaluation score than a score based on a static relationship of grain values;
said disambiguation comprising remapping the correspondence of fine-grained entities to coarser-grained entities when required to remove an ambiguity in how a fine grained entity maps to a coarser grained entity; and
said unfettering comprising re-expressing the constraint in terms of finer-grained entities of dimension coordinates satisfying an original, coarser-grained constraint when required to account for a time changing relationship between finer grains and coarser grains.

2. The method of claim 1, wherein said disambiguation comprises:
processing data indicative of how the relationships of finer grain values to coarser grain values changes over time includes, for the particular coarser grain value,
determining a set of finer grain values for dimension coordinates having the particular coarser grain value;
determining a set of dimension coordinates having finer grain values in the determined set of finer grain values, including dimension coordinates having finer grain values in the determined set of finer grain values but not having the particular coarser grain value.

3. The method of claim 1, wherein said unfettering comprises:
for the dimension coordinates having the particular finer grain value, on which the determination of evaluative score for the particular finer grain value is based, at least some of those dimension coordinates do not have the particular coarser grain value.

4. The method of claim 3, wherein:
determining a set of dimension coordinates having finer grain values in the determined set of finer grain values, including dimension coordinates having finer grain values in the determined set of finer grain values but not having the particular coarser grain value includes:
processing a query constraint that is expressed in terms of the particular coarser grain value to determine an initial set of dimension coordinates; and
rewriting and reapplying the query constraint in terms of finer grain values of the determined initial set of dimension coordinates, to determine the set of dimension coordinates.

5. The method of claim 1, wherein:
the particular finer grain value is a first particular finer grain value of a plurality of particular finer grain values; and
the method further comprises
processing a temporal mode to determine a time extent descriptor; and
determining the plurality of finer grain values based at least in part on processing the determined time extent descriptor.

6. A computer program product for processing a performance query to a dimensionally-modeled fact collection by processing dimension coordinates that exist within a dimensional data model, wherein facts of the dimensionally-modeled fact collection are accessible according to the dimensional data model and wherein the dimension coordinates have a first particular grain ("finer grain") that is finer than a second particular grain ("coarser grain"), the method to determine an evaluative score for a particular value at the finer grain ("finer grain value") based on performance facts for dimension coordinates associated with the particular finer grain value, the computer program product comprising at least one computer-readable medium having computer program instructions stored therein which are operable to cause at least one computing device to:
determine at least one performance parameter, relative to a particular value at the coarser grain ("coarser grain value"), against which to measure the performance facts associated with the finer grain value, including processing temporal relationships of finer grain values to coarser grain values for the dimension coordinates, wherein processing the temporal relationships of finer grain values to coarser grain values includes processing data indicative of how relationships of the finer grain values to coarser grain values change over time and, based thereon, processing performance facts based on performance facts for dimension coordinates having the particular coarser grain value; and
determine the evaluative score for the particular finer grain value based on performance facts of dimension coordinates having the particular finer grain value, in view of the at least one determined performance parameter;
wherein processing the temporal relationships of finer grain values to coarser grain values includes performing one or both of unfettering and disambiguation to account for a changing relationship of grains so that the evaluative score is adjusted to provide a different type of evaluation score than a score based on a static relationship of grain values;
said disambiguation comprising remapping the correspondence of fine-grained entities to coarser-grained entities when required to remove an ambiguity in how a fine grained entity maps to a coarser grained entity; and
said unfettering comprising re-expressing the constraint in terms of finer-grained entities of dimension coordinates satisfying an original, coarser-grained constraint when required to account for a time changing relationship between finer grains and coarser grains.

7. The computer program product of claim 6, wherein said disambiguation comprises:
processing data indicative of how the relationships of finer grain values to coarser grain values changes over time includes, for the particular coarser grain value, includes
determining a set of finer grain values for dimension coordinates having the particular coarser grain value;
determining a set of dimension coordinates having finer grain values in the determined set of finer grain values, including dimension coordinates having finer grain values in the determined set of finer grain values but not having the particular coarser grain value.

8. The computer program product of claim 6, wherein said unfettering comprises:
for the dimension coordinates, having the particular finer grain value, on which the determination of performance score for the particular finer grain value is based, at least some of those dimension coordinates do not have the particular coarser grain value.

9. The computer program product of claim 8, wherein:
determining a set of dimension coordinates having finer grain values in the determined set of finer grain values, including dimension coordinates having finer grain values in the determined set of finer grain values but not having the particular coarser grain value includes:
processing a query constraint that is expressed in terms of the particular coarser grain value to determine an initial set of dimension coordinates; and
rewriting and reapplying the query constraint in terms of finer grain values of the determined initial set of dimension coordinates, to determine the set of dimension coordinates.

10. The computer program product of claim 6, wherein:
the particular finer grain value is a first particular finer grain value of a plurality of particular finer grain values; and
the computer program instructions are further operable to cause at least one computing device to:
process a temporal mode to determine a time extent descriptor; and
determine the plurality of finer grain values based at least in part on processing the determined time extent descriptor.

11. A computer system configured to process a performance query to a dimensionally-modeled fact collection by processing dimension coordinates that exist within a dimensional data model, wherein facts of the dimensionally-modeled fact collection are accessible according to the dimensional data model and wherein the dimension coordinates have a first particular grain ("finer grain") that is finer than a second particular grain ("coarser grain"), the method to determine an evaluative score for a particular value at the finer grain ("finer grain value") based on performance facts for dimension coordinates associated with the particular finer grain value, the computer system configured to:
determine performance parameters, relative to a particular coarser grain value, against which to measure the performance facts associated with the finer grain value, including processing the temporal relationships of finer grain values to coarser grain values for the dimension coordinates; and determine the evaluative score for the particular finer grain value based on performance facts of dimension coordinates having the particular finer grain value, in view of the determined performance parameters;

wherein processing the temporal relationships of finer grain values to coarser grain values includes performing one or both of unfettering and disambiguation to account for a changing relationship of grains so that the evaluative score is adjusted to provide a different type of evaluation score than a score based on a static relationship of grain values;

said disambiguation comprising remapping the correspondence of fine-grained entities to coarser-grained entities when required to remove an ambiguity in how a fine grained entity maps to a coarser grained entity; and said unfettering comprising re-expressing the constraint in terms of finer-grained entities of dimension coordinates satisfying an original, coarser-grained constraint when required to account for a time changing relationship between finer grains and coarser grains.

12. The computer system of claim 11, wherein said disambiguation comprises:

processing data indicative of how the relationships of finer grain values to coarser grain values changes over time includes, for the particular coarser grain value, includes determining a set of finer grain values for dimension coordinates having the particular coarser grain value;

determining a set of dimension coordinates having finer grain values in the determined set of finer grain values, including dimension coordinates having finer grain values in the determined set of finer grain values but not having the particular coarser grain value.

13. The computer system of claim 11, wherein said unfettering comprises:

for the dimension coordinates, having the particular finer grain value, on which the determination of performance score for the particular finer grain value is based, at least some of those dimension coordinates do not have the particular coarser grain value.

14. The computer system of claim 11, wherein:

determining a set of dimension coordinates having finer grain values in the determined set of finer grain values, including dimension coordinates having finer grain values in the determined set of finer grain values but not having the particular coarser grain value includes:

processing a query constraint that is expressed in terms of the particular coarser grain value to determine an initial set of dimension coordinates; and rewriting and reapplying the query constraint in terms of finer grain values of the determined initial set of dimension coordinates, to determine the set of dimension coordinates.

15. The computer system of claim 11, wherein:

the particular finer grain value is a first particular finer grain value of a plurality of particular finer grain values; and the computer system is further configured to:

process a temporal mode to determine a time extent descriptor; and determine the plurality of finer grain values based at least in part on processing the determined time extent descriptor.

* * * * *